(12) United States Patent
Mérida-Donis

(10) Patent No.: US 6,569,298 B2
(45) Date of Patent: May 27, 2003

(54) APPARATUS FOR INTEGRATED WATER DEIONIZATION, ELECTROLYTIC HYDROGEN PRODUCTION, AND ELECTROCHEMICAL POWER GENERATION

(75) Inventor: Walter Roberto Mérida-Donis, Victoria (CA)

(73) Assignee: Walter Roberto Merida-Donis, Vancouver (CA)

( * ) Notice: Subject to any disclaimer, the term of this patent is extended or adjusted under 35 U.S.C. 154(b) by 0 days.

(21) Appl. No.: 09/875,281

(22) Filed: Jun. 5, 2001

(65) Prior Publication Data

US 2002/0017463 A1 Feb. 14, 2002

Related U.S. Application Data
(60) Provisional application No. 60/209,518, filed on Jun. 5, 2000.

(51) Int. Cl.[7] .............................. C25B 9/00; C25C 7/00; C25D 17/00
(52) U.S. Cl. ...................... 204/263; 204/242; 204/252; 429/17; 429/19; 429/21
(58) Field of Search ...................... 204/DIG. 4, DIG. 3, 204/242, 252, 263; 205/628, 633, 637; 429/17, 19, 21

(56) References Cited

U.S. PATENT DOCUMENTS

| | | | | |
|---|---|---|---|---|
| 5,219,671 | A | * | 6/1993 | Parker et al. .......... 204/157.48 |
| 5,346,778 | A | * | 9/1994 | Ewan et al. ........... 204/DIG. 4 |
| 5,425,858 | A | | 6/1995 | Farmer |
| 5,512,145 | A | * | 4/1996 | Hollenberg ................. 136/206 |
| 5,954,937 | A | | 9/1999 | Farmer |

* cited by examiner

Primary Examiner—Roy King
Assistant Examiner—Wesley A. Nicolas
(74) Attorney, Agent, or Firm—Dorsey & Whitney LLP

(57) ABSTRACT

The present invention is directed to an apparatus and method for deionization and hydrogen fuel production in a fuel generation mode, and electricity production in a power generation mode. In one embodiment, a capacitive deionization (CDI) device receives water and electrical energy to produce deionized water that is transferred to a proton electrode membrane electrolysis (PEME) device to produce hydrogen fuel by electrolysis. A storage system receives the hydrogen. The hydrogen is transferred from the storage system to a proton electrode membrane fuel cell (PEMFC) device that produces electrical energy. In another embodiment, the PEME and the PEMFC are functionally combined in a unitary regenerative fuel cell (URFC). In still another embodiment, a humidification unit and the CDI are functionally combined. In yet another embodiment, a CDI, URFC and the humidification unit are combined in a single unitary assembly.

55 Claims, 12 Drawing Sheets

APPARATUS FOR INTEGRATED WATER DEIONIZATION, ELECTROLYTIC HYDROGEN PRODUCTION, AND ELECTROCHEMICAL POWER GENERATION

CROSS-REFERENCE TO RELATED APPLICATION

This application claims priority from United States Provisional Patent Application No. 60/209,518, filed Jun. 5, 2000.

TECHNICAL FIELD

The present invention generally relates to an integrated apparatus for the production of gaseous fuel, purified water and electrical power. More particularly, the present invention relates to an integrated apparatus having a water deionization system operatively coupled to an electrolytic hydrogen generator and a fuel cell power plant.

BACKGROUND OF THE INVENTION

Fossil fuel combustion has been identified as a significant contributor to numerous adverse environmental effects. For example, poor local air quality, regional acidification of rainfall that extends into lakes and rivers, and a global increase in atmospheric concentrations of greenhouse gases (GHG), have all been associated with the combustion of fossil fuels. In particular, increased concentrations of GHG's are a significant concern since the increased concentrations may cause a change in global temperature, thereby potentially contributing to global climatic disruption. Further, GHG's may remain in the earth's atmosphere for up to several hundred years.

One problem associated with the use of fossil fuel is that the consumption of fossil fuel correlates closely with economic and population growth. Therefore, as economies and populations continue to increase worldwide, substantial increases in the concentration of GHG's in the atmosphere is expected. A further problem associated with the use of fossil fuels is related to the inequitable geographical distribution of global petroleum resources. In particular, many industrialized economies are deficient in domestic supplies of petroleum, which forces these economies to import steadily increasing quantities of crude oil in order to meet the domestic demand for petroleum derived fuels.

Fossil fuels are used for a variety of purposes, but the most significant quantities of fossil fuels are dedicated to low-temperature space heating, electricity generation and transportation. Of these, transportation is the largest consumer of fossil fuels. In 1996, for example, transportation accounted for almost two-thirds of the 120 billion gallons of gasoline and 27 billion gallons of diesel fuel consumed in the United States. (US Dept. of Energy, Energy Information Administration, *Annual Energy Review* 1996, DOE/EIA-0384(96), Washington, D.C. (1997)). Consequently, the transportation sector's large consumption of fossil fuels coupled with a growing concern over the environmental and geopolitical consequences surrounding the use of fossil fuels are major driving forces stimulating the development of new transportation technologies. While certain technologies aim to coexist with current transportation technologies, others seek to replace them entirely.

One of these new transportation technologies is the hybrid diesel/electric and the gasoline/electric automobile. Hybrid vehicles combine a small diesel or gas engine with an electrical generator that provides electricity to a bank of storage batteries. The storage batteries, in turn, provide power to an electric motor that drives the wheels of the vehicle. Current hybrid vehicles are capable of achieving 60 to 80 miles per gallon of fuel, thereby reducing combustion emissions by using less fuel than conventional internal combustion engine vehicles.

Another new transportation technology is directed to improvements in fossil fuels. For example, the automotive and oil industries are jointly developing a "clean diesel" fuel technology that combines improved fuels with improved catalytic converters to cooperatively yield a reduction in nitrous oxides, sulfur oxides, carbon monoxide and particulate matter emissions. As a result, emissions from the diesel engine have been reduced by as much as 90%.

Still another new transportation technology is the battery powered electric vehicle (BPEV). Although BPEV's were introduced in the early 1900s, they have historically had a negligible presence in the consumer marketplace. Recently, however, some automobile manufacturers have introduced electric vehicles, such as the General Motors EV1™, the Ford RANGER™ EV pickup and the Chrysler EPIC™ EV minivan. Despite substantial advances in low weight materials, however, BPEV's still suffer from weight limitations and poor performance. In particular, the low volumetric and gravimetric energy densities found in storage batteries remains a substantial barrier impeding the widespread use of BPEV's. These low energy densities translate into short operational ranges between recharging. Currently, a typical range for a BPEV is between 75 and 130 miles. Further, BPEV's are limited principally to light-duty applications, and require battery replacement every few years, which necessitates the institution of recycling or disposal programs to dispose of the depleted batteries.

The application of fuel cell technology to the BPEV may make the BPEV practical by eliminating the drawbacks associated with the use of storage batteries. Unlike a storage battery, a fuel cell does not internally store energy, and does not consume materials that are stored within the battery to generate electricity. Instead, the fuel cell converts an externally supplied fuel and oxidizer to electricity and reaction products. For example, in an electrochemical fuel cell employing hydrogen as the fuel and oxygen as the oxidizer, the reaction products are water and heat.

A total of six different fuel cell technologies have been identified as being suited for power generation in stationary and mobile applications. The details and operational characteristics of each of these technologies have been extensively reviewed. (A. J. Appleby and F. R. Foulkes, *Fuel Cell Handbook,* Krieger Publishing Company, Malabar, Fla., USA (1993)). Of these, the Proton Exchange Membrane Fuel Cell (PEMFC) has been identified as the most suitable technology for vehicular applications.

Referring now to FIG. 1, a cross sectional, schematic view of a PEMFC 10 according to the prior art is shown. The PEMFC cell 10 includes a centrally positioned membrane electrode assembly (MEA) 101, which is comprised of an anode electrode layer 103, a cathode electrode layer 104, an electrocatalyst layer 107 disposed on the anode electrode layer 103, an electrocatalyst layer 108 disposed on the cathode electrode layer 104. The electrocatalyst layers 107 and 108 promote the desired electrochemical reaction. The polymer membrane electrode 102 is comprised of a material that readily permits the transport of ions and solvent between the anode electrode layer and the cathode electrode layer during operation of the fuel cell, but is relatively impermeable to gases. A suitable material for the polymer membrane electrode is the perfluorinated polymer NAFION, manufactured by E. I. Dupont de Nemours & Co. of Wilmington, Del. During operation of the PEMFC cell 10, hydrogen flowing through fuel channels 109 formed in an anode flow field plate 110 move through the anode electrode layer 103 and is oxidized at the anode electrocatalyst layer 107 to yield electrons to the anode electrode layer 103 and hydrogen ions, which migrate through the MEA 101.

Still referring to FIG. 1, the electrochemical reaction for hydrogen dissociation occurring at the layer 107 is given by equation 1:

$$2H_2(g) \rightarrow 4H^+ + 4e^- \qquad (1)$$

At the same time, oxygen flowing through oxidizer channels 111 formed in a cathode flow field plate 112 move through the cathode electrode layer 104 to combine with the hydrogen ions that have migrated through the MEA 101 and electrons from the cathode electrode layer 104 to form water. This electrochemical reaction is given by equation 2:

$$O_2(g) + 4H^+ + 4e^- \rightarrow 2H_2O(l) \qquad (2)$$

The overall electrochemical reaction for the PEMFC 10 therefore given by equation 3:

$$2H_2(g) + O_2(g) \rightarrow 2H_2O(l) \qquad (3)$$

An electron current 113 travels from the anode flow field plate 110 through an external electrical load 114 to the cathode flow field plate 112 to provide electrons for the reaction occurring at the cathode electrocatalyst layer 108. The DC current thus produced may be converted into AC current and subsequently used to power electrical devices requiring a supply of AC current.

Single PEMFC cells 10 may be electrically coupled in sequence to form a fuel cell stack with the individual cells 10 being electrically interconnected in series. One advantage of serially interconnected stacks is that the voltage obtained from the stack is a multiple of the number of cells 10 comprising the stack. Alternatively, a parallel interconnection of individual cells 10 is also possible. In a parallel-interconnected arrangement of cells 10, the stack yields the individual cell 10 voltage, but larger currents may be delivered. For purposes of illustration, a serially connected stack arrangement is assumed, but other interconnection methods may also be used, and are within the scope of the present invention. Stacking is typically accomplished using electrically conductive bipolar plates which act both as the anode separator plate of one cell 10 and as the cathode separator plate of the next cell 10 in the stack. The bipolar plates may also combine the functions of anode and cathode flow field plates 110 and 112 when they are provided with fuel channels and oxidizer channels.

Referring still to FIG. 1, since the MEA 101 consists of a solid material, it must be kept wet so that ions can migrate through the MEA 101. Therefore, the reactant streams are generally humidified before they enter the fuel cell stack to maintain the desired protonic conductivity. Humidification of the stack is an important aspect of PEMFC operation because unequal humidification levels can lead to uneven temperature distributions within the stack. For example, in extreme cases, a system failure, including the rupture of the separating membranes may occur as a result of dry regions within the fuel cell stack. Consequently, current PEMFC stack designs incorporate external or internal humidification devices to ensure proper reactant humidification prior to the delivery of the reactants to the electrochemically active regions. External humidification can be achieved, for example, by flowing the reactant streams through a sealed reservoir containing deionized water. A porous nozzle at the bottom of the sealed reservoir disperses the gases into small bubbles that travel to the top of the reservoir and, in the process, capture and carry water vapor. The temperature and pressure in the reservoir can be used to control the desired humidification levels. U.S. Pat. No. 5,382,478 to Clarence and Wozniczka, for example, discloses an internal humidification system that incorporates a dedicated humidification module located upstream from the electrochemically active section in a PEMFC stack. A drawback present in this approach is that a sizeable fraction of the stack volume is devoted to reactant conditioning.

FIG. 2 is a cross sectional, schematic view of a PEMFC device 20 that utilizes an internal module for humidification of the reactants according to the prior art. The assembly 20 includes a PEMFC stack 201, an internal humidification module 202, an electrochemically active region 203, a water deionization apparatus 204, which typically consists of an ion-exchange column, a deionized water reservoir 205, a water recirculation pump 206, a fuel storage system (not shown), and a heat exchanger 207. In the assembly 20, deionized water is used to both condition the reactants, and to serve as a heat exchange fluid in the cooling system to maintain the PEMFC stack 201 at the desired operating temperature. To accomplish both functions, water is concurrently pumped through the humidification module 202 and through cooling elements 208 positioned at evenly spaced locations in the electrochemically active module 203.

Still referring to FIG. 2, a fuel stream containing hydrogen is delivered to a fuel inlet port 209. In vehicular applications, this port is typically connected to the on-board fuel storage system (not shown). Similarly a stream of compressed oxidizer that may be ambient air at moderate pressures (e.g., 30 psig) is delivered to an oxidizer inlet port 210. Both reactants are distributed internally to the electrochemically active region 203. Excess reactants exit the PEMFC stack 201 through a fuel outlet port 211 and an oxidizer outlet port 212. Usually, excess fuel is recirculated by an appropriate pumping mechanism (not shown), while excess oxidizer may be vented to the atmosphere.

Once the reactants reach the electrochemically active module 203, heat is produced as a byproduct of the electrochemical reactions. A deionized water stream is delivered to a coolant inlet port 213 and concurrently pumped through the humidification module 202, and the cooling elements 208 within the electrochemically active module 203. The deionized water stream then exits the PEMFC stack 201 through a coolant outlet port 214. The water flowing through the cooling elements 208 receives the excess heat and carries it to the heat exchanger 207, to cool the water to approximately its original temperature. The water is then returned to the deionized water reservoir 205 for recirculation. Product water from the cathodic reaction and excess humidity in the unused reactant streams are also deposited in the deionized water reservoir 205. Proper thermal management is required to maintain the stack within the specified operating temperature range.

The electricity produced by the device 20 is collected at a positive terminal 215 and a negative terminal 216. A DC current may then be delivered to a power-handling module 217 and may be subsequently conditioned (e.g., converted to AC current) by a power-conditioning module 218. After conditioning, the electric current may be delivered to an electrical power consumer, such as a vehicle propulsion system.

Referring now to FIG. 3, a partial cross sectional view of an internal humidification module 202 is shown, according to the prior art. Module 202 is comprised of a plurality of repetitive humidification cells 301 formed by alternating separating plates 303 and water permeable membranes 302. The separating plates 303 include a plurality of parallel open-faced water channels 304 on one side and a plurality of parallel open-faced reactant channels 305 on the opposing side. The reactant channels 305 typically carry a fuel gas stream containing hydrogen 306, and an oxidizer gas stream containing oxygen 307. The oxidizer channels extend between an oxidizer inlet manifold opening (not shown) and an oxidizer outlet manifold opening (also not shown), and may traverse the plates 303 in a plurality of passes.

Still referring to FIG. 3, the water flowing in the water channels 304 is deionized to avoid contamination of the permeable membranes 302, and further to minimize the possibility of electrical short-circuits within the active module 203 (as shown in FIG. 2). In addition, this water is maintained at the same pressure as the incoming reactants to minimize the mechanical stress on the water permeable membranes 302 and also to prevent water boil-off due to excess heat produced by the PEMFC stack 201 during peak power production. In current implementations, these pressures are relatively low (e.g., 30 psig for automotive applications). As water flows through the water channels 304, it migrates across the permeable membrane 302 and is evaporated upon exposure to the flowing reactant gases. The rate of evaporation and, consequently, the rate of reactant humidification is controlled by varying the temperature and pressure of the flowing water, as well as the flow rate of the incoming dry reactants. As the reactant gases travel through the channels, the humidity present in the reactive gases increases until the desired levels are reached, whereupon they are be delivered to the electrochemically active section 203 (as shown in FIG. 2).

Vehicular power plants based on the foregoing concepts have been successfully demonstrated in fuel cell vehicles (FCV's). However, the nature and timing of the transition to FCV's remains unclear primarily due to uncertainties related to the supporting hydrogen fuel generation infrastructure. There are several approaches proposed for solving this infrastructure problem.

The first approach is a transitional approach. It is based on the assertion that there is no economic incentive to develop a direct hydrogen-refueling infrastructure until FCV's achieve some threshold level of consumer penetration. Since consumers, on the other hand, have no incentive to acquire FCV's unless they can conveniently refuel them, the transitional approach proposes the utilization of existing liquid hydrocarbon fuels, such as gasoline and methanol, to power hydrogen fuel cell vehicles. Such a method circumvents the need to establish a direct hydrogen-fueling infrastructure, by using the existing liquid fuel distribution system. This approach generally employs on-board fuel reformers that operate while the vehicle is running, converting these hydrocarbon fuels to a hydrogen-rich gas stream (a typical stream consists of 75% hydrogen, 0.4% CO, with the rest being $CO_2$). This reformate stream is, in turn, delivered to the vehicle's fuel cell power plant.

The leading fuel processor technologies employ partial oxidation and high-temperature steam reforming. For example, Epyx has developed a multiple-fuel processor (gasoline, ethanol, methanol, natural gas, propane) employing partial oxidation. (W. P. Teagan, J. Bentley, and B. Barnett, *Cost Reductions of Fuel Cells for Transport Applications: Fuel Processing Options*, J. of Power Sources, 71, pp. 80–85 (March 1998)). Hydrogen Burner Technology Inc. has also scheduled the first pre-commercial prototypes of its F3P fuel processors. Despite recent breakthroughs and support from the US Department of Energy, however, reforming processes still result in the generation of GHG's and other harmful emissions. While on-board reforming has the benefit of providing an immediate solution to early adopters of FCV's, it re-introduces some of the problems that FCV's were designed to eliminate, namely the environmental and geopolitical difficulties associated with the utilization of fossil fuels. While the use of methanol, instead of gasoline, partially addresses these concerns, it creates the need to implement an entirely new methanol production and refueling infrastructure. The significant cost associated with this undertaking makes this approach prohibitive for oil companies to pursue. This is particularly significant if methanol will only play a temporary role in the transition from a fossil fuel based economy to a hydrogen-based economy.

The second approach proposes moving to a direct hydrogen-refueling infrastructure at the outset. The difficulty with such approach is that there is no economic incentive to build an external infrastructure in the absence of consumer demand. A highly centralized structure, in which hydrogen is produced in large plants and shipped or piped to refueling stations seems especially problematic, due to the very high capital costs. In response, various groups have proposed the decentralized production of hydrogen at the refueling point. Two principal methods of hydrogen production have been proposed.

One method for developing a decentralized, direct hydrogen-fueling infrastructure involves the utilization of hydrocarbon fuels, such as methane, as a feedstock. Methane, the major component in natural gas, is readily available in most urban areas, through a pre-existing network of underground pipelines. Small-scale methane reformers connected to these gas pipelines could allow local gasoline stations to produce hydrogen on demand. This method, while partially addressing some of the geopolitical concerns associated with the use of imported oil, retains at least one of the problems that FCV's were designed to eliminate, namely, the environmental concerns associated with the utilization of hydrocarbon fuels.

Another method involves producing hydrogen through the electrolysis of water. In this process, electrical current is provided to an electrolyzer to dissociate water into its hydrogen and oxygen constituents. The resulting hydrogen gas is then compressed or liquefied and delivered to the on-board storage systems in FCV's. Stuart Energy Systems, of Ontario, Canada, for example, has implemented hydrogen fuel cell-powered bus refueling stations using this approach. While hydrogen is more costly to produce through electrolysis than through methane reforming, the approach has the advantage of potentially eliminating the use of hydrocarbon fuels at the point of refueling. Furthermore, if the electricity is produced through sustainable means, such as solar, wind, hydroelectric, geothermal or nuclear power, then harmful atmospheric emissions are removed throughout the entire energy production chain. Thus, an approach using decentralized electrolyzers minimizes infrastructure costs, because it relies solely on electricity and water as feedstocks, both of which are widely available in urban areas.

Currently, four methods for de-centralized electrolytic hydrogen production are available:
 i) Advanced alkaline water electrolysis (AWE),
 ii) High temperature electrolysis (HTE)
 iii) Inorganic membrane alkaline electrolysis (IME), and iv) Solid polymer (e.g., proton exchange membrane) electrolysis (PEME)

The principles of operation and current technical challenges associated with each of these methods have been reviewed. (S. Dutta, *Technology Assessment of Advanced Electrolytic Hydrogen Production,* International Journal of Hydrogen Energy, Vol. 15, No. 6, pp. 379–386 (1990)). Presently, conventional alkaline water electrolysis is the technology of choice for large-scale electrolytic hydrogen production. However, IME and PEME appear to be suitable options for generating hydrogen on-board regenerative fuel cell vehicles (RFCV's). IME is based on the replacement of conventional asbestos separators (in alkaline electrolysis) with a thin, low-resistance polyantimonic membrane. See for example, U.S. Pat. No. 4,253,936 to Vandenborre, which discloses a fabrication method for these membranes. In a separate publication, Vandenborre also identifies some of the challenges found in the early development stages. (H. Vandenborre, R. Leysen, and H. Nackaerts, *Developments on IME-Alkaline Water Electrolysis,* Int. J. Hydrogen Energy, Vol. 8, No. 2, pp. 81–83 (1983)). IME technology is currently being developed into commercial electrolysis products by, for example, Hydrogen Systems, Inc., of Montreal, Quebec, Canada. In addition, U.S. Pat. Nos. 4,636,291 and 4,356,231 to Divisek et al., disclose advances in the design of diaphragm separators required for IME. The use of non-noble metal catalysts makes IME technology attractive when compared to solid polymer systems that require more expensive noble catalysts (e.g., Platinum, and Platinum-Ruthenium alloys). However, PEME technology is more compatible with the PEMFC power plants currently under development by automotive manufacturers. Compared to PEMFC's, PEM electrolyzers (PEME's) operate in an analogous but inverse manner. In these devices, water and electricity are supplied to accomplish the electrolytic separation of water molecules into their constitutive elements, hydrogen and oxygen.

FIG. 4 is a schematic representation of a PEME cell 30 according to the prior art. A membrane electrode assembly (MEA) 401 similar to that described above for the PEMFC 10, which is shown in FIG. 1, includes a cathode electrode layer 403 and an anode electrode layer 404 having electrocatalyst layers 407 and 408. The electrocatalyst layers 407 and 408 are generally comprised of Pt, $IrO_2$, or other alloys. During operation of the PEME cell 30, a deionized water stream may be delivered to either side of PEME cell 30. Different approaches for water supply have been considered, including static water feed, anode water feed, and cathode water feed. The details of each of these methods have been reviewed. (Mitlitsky et al., *Applications and Development of High Pressure PEM Systems,* in Proceedings of the Portable Fuel Cells Conference, Lucerne Switzerland, Jun. 21–23, 1999). In this description, and merely for illustrative purposes, anode water feed is assumed. Accordingly, a deionized water stream 409 is delivered to flow field channels formed in an anode plate 410. This water migrates through the anode electrode layer 404 and reaches the electrocatalyst layer 408 where it is oxidized. The products of this oxidization are molecular oxygen gas, hydrogen ions, and electrons. The electrochemical reaction for oxygen evolution is given by equation 4:

$$2H_2O(l) \rightarrow O_2(g) + 4H^+ + 4e^- \tag{4}$$

The resulting hydrogen ions migrate through the membrane 402 and reach the electrocatalyst layer 407 on the cathode electrode layer 403 to form molecular hydrogen. The product hydrogen is collected in a hydrogen stream 411 that travels through a hydrogen flow field channel formed in a cathode plate 412. The electrochemical reaction for hydrogen evolution is given by equation 5:

$$4H^+ + 4e^- \rightarrow 2H_2(g) \tag{5}$$

For cells operating below the boiling point of water, the overall electrochemical reaction is given by equation 6:

$$2H_2O(l) \rightarrow 2H_2(g) + O_2(g) \tag{6}$$

For thermodynamic reasons, the foregoing reaction does not occur spontaneously under ambient temperatures and pressures. Consequently, energy must be supplied to promote the desired reactions. Usually, the required energy is delivered in the form of an electric current 413 provided by a power supply 414. The applied voltages across the cell are usually between 1 and 2 volts. It should be noted that the reactions in equations (4), (5) and (6) correspond exactly to the reverse of the electrochemical processes occurring in a PEMFC and described by equations (1), (2) and (3) respectively.

Multiple single PEME cells 30 may be stacked to form a PEME stack. Stacking is typically accomplished by using electrically conductive bipolar plates that act both as the anode separator plate of one PEME cell 30 and as the cathode separator plate of the next PEME cell 30 in the stack. The cells 30 are further fluidly and electrically interconnected during the operation of the PEME stack.

Referring now to FIG. 5, a schematic view of a PEME system 40 according to the prior art is shown. The PEME system 40 is generally comprised of a PEME stack 501 positioned between an anode plate 506 and an opposing cathode plate 505. A hydrogen manifold 516 is positioned at the anode plate 506, and an oxygen manifold 517 is positioned at the cathode plate 505. The anode plate 506 and the cathode plate 505 are coupled to a DC power supply through a DC power input port 504. The PEME stack 501 is further coupled to a water deionization module 503, which typically consists of filters and an ion-exchange column, to deliver deionized water to the PEME stack 501. Deionized water is also circulated through the PEME stack 501 by a recirculation pump 512 for cooling, or other purposes.

During operation of the PEME 40, externally supplied water from municipal source flows through the water deionization module 503. The purified water stream 515 is delivered to a water storage vessel 509 and subsequently distributed throughout the PEME stack 501 by static, anode, or cathode-feed methods. Presently, for purposes of illustration, an anode-feed implementation is assumed. However, other water feed methods would also be suitable.

Still referring to FIG. 5, after water migrates through the porous electrode substrates (not shown in FIG. 5) in the PEME stack 501, the water is decomposed into hydrogen and oxygen at the catalytic sites. These gases are produced on opposite sides of the MEA assemblies (not shown in FIG. 5) and separated by the gas-impermeable, polymeric ionic conductor (also not shown in FIG. 5). The resulting two-phase mixture of hydrogen and water is collected at the hydrogen manifold 516. Similarly, the two-phase mixture of oxygen and water is collected at the oxygen manifold 517. The two-phase mixture of hydrogen and water 518 flows out of the PEME stack 501 and through a check valve 520 to prevent the two-phase mixture 518 from returning to the PEME stack 501. A phase separator 514 that separates the hydrogen gas from the water receives the mixture 518 from the check valve 520. The phase separator 514 delivers the water to the vessel 509. Similarly, the two-phase mixture of oxygen and water 519 flows out of the stack 501 and through a check valve 521 to prevent the two-phase mixture 519 from returning to the PEME stack 501. A phase separator 513 that separates the oxygen gas from the water receives the mixture 519 from the check valve 521. The phase separator 513 delivers the water to the vessel. The product hydrogen flows from the phase separator 514 into a condenser 511 to further remove water from the hydrogen gas. The hydrogen is then routed through a hydrogen outlet port 507, through a check valve 522 to a mechanical compression system 523, which can be external to the PEME system 40. The product hydrogen is then accumulated into a fuel storage system 524. For the purposes of this description, the storage system 524 is assumed to comprise a plurality of pressure vessels 525 with a safety relief valve 526, a control valve 527, and a dispensing regulator 528 fluidly coupled to the vessels 525. Burst discs 529 may be used to relieve excess gas pressure accumulated in the vessels 525 by expelling the gas by bursting. The product oxygen flows from the phase separator 513 into a condenser 510 to remove the residual water. The oxygen is then routed through an oxygen outlet port 508 to a leak valve 530. Alternatively, the oxygen generated within the PEME stack 501 may be compressed and accumulated in a suitable storage system similar to that used for hydrogen.

PEME technology advantageously provides current densities and energy efficiencies that are superior to conventional (e.g., alkaline) electrolysis. (M. Yamaguchi et al., *Development of 2500 cm$^2$ Solid Polymer Electrolyte Water Electrolyzer in WE-NET*, in Proceedings of the XII International Conference on Hydrogen Energy, Buenos Aires, Argentina, 1998, pp.747–755). Further, the symmetry between PEMFC's and PEME's suggests that these two technologies may be combined into integrated, dual function devices. By integrating PEMFC stacks with PEME stacks, it is possible to design systems that can both produce electricity from hydrogen and oxygen, and electrolytically regenerate these reactants from electricity and water. Such a system is termed a regenerative fuel cell (RFC) system. When such systems employ a single stack that may be reversibly operated to function as either a PEMFC or a PEME, it is termed a unitized regenerative fuel cell (URFC) system.

RFC's have been known for more than 20 years. For example, U.S. Pat. No. 3,992,271 to Danzig, et al., and U.S. Pat. No. 3,981,745 to Stedman disclose methods for gas and power generation, based on the foregoing concepts. However, neither of these patents discloses a method for coupling water deionization technologies with RFC's or URFC's. More recent developments include detailed analyses performed in 1994 at Lawrence Livermore National Laboratory (LLNL). These analyses determined that URFC's could be used to design systems that are lighter and less complex than regenerative fuel cell systems that employ separate (discrete) stacks as fuel cells and electrolyzers. In collaboration with commercial developers such as Proton Energy Systems of Rocky Hill, Conn., a modified primary fuel cell device with a single cell has been operated reversibly for thousands of cycles at LLNL with negligible degradation. The URFC uses dual function electrodes, where the oxidation and reduction electrodes reverse roles when switching from charge to discharge, as, for example, within a rechargeable battery, to achieve both the fuel cell and electrolyzer functions. (F. Mitlitsky, B. Myers, and A. H. Weisberg, *Regenerative Fuel Cell Systems,* Energy & Fuels, 12, pp. 56–71 (1998)).

The combination of a PEME with a PEMFC, or the use of a URFC in vehicular applications affords the vehicle the flexibility to refuel the vehicle from an external, high pressure hydrogen source, or by producing hydrogen fuel on-board the vehicle by coupling the vehicle to an external supply of electricity and water. The advantage of such vehicles, known as regenerative fuel cell vehicles (RFCV's), is that they eliminate the requirement to implement a very costly direct hydrogen-refueling infrastructure. Thus, the RFCV is capable of carrying a hydrogen infrastructure on-board, thereby eliminating the need for a dispersed network of electrolyzers and other associated hardware. RFCV's, in effect, use electrolytically generated hydrogen as a storage medium for electrical energy.

The production of hydrogen fuel on-board passenger vehicles was suggested as early as 1980. For example, U.S. Pat. No. 4,368,696 to Reinhart discloses a method for supplementing vehicular fuel with an on-board hydrogen generation system. According to the disclosed invention, heat derived from the exhaust gases of an internal combustion engine is used to electrolyze water into hydrogen and oxygen, which are then used to enhance the fuel combustion in the vehicle's engine. Significantly, no disclosure of an electrochemical method for electricity generation, or the use of fuel cell and electrolyzers operating reversibly is present. More recently, U.S. Pat. Nos. 5,813,222 and 5,953,908 to Appleby disclose a method and apparatus for hydrogen generation. The resulting hydrogen is used to heat a catalytic converter and reduce vehicular emissions. U.S. Pat. No. 5,964,089 to Murphy, et al. discloses diagnostic and control systems for on-board hydrogen generation and delivery. U.S. Pat. Nos. 5,830,426, 5,690,902, and 5,510,201 to Werth disclose a method for generating hydrogen on-board a FCV. However, the disclosure in the Werth patents is not based on electrolysis. Instead it uses solid, metallic particles as the raw materials for hydrogen production.

The implementation of on-board fuel production is most effective if the fuel can be delivered at high pressure in order to eliminate the need for an external hydrogen compression infrastructure. Hydrogen fuel delivered to the consumer must include not only the cost of production, but also include the costs associated with the storage, transport, and dispensing of the liquid hydrogen at approximately its normal boiling point (−423 degrees Fahrenheit or −253 degrees Celsius). The high costs associated with liquefaction and the additional infrastructure required to handle cryogenic liquids represent barriers that have prevented liquefied hydrogen from being seriously considered as a vehicular fuel.

Compressed hydrogen, however, has been successfully used in FCV demonstration projects. Typically, the hydrogen fuel is stored on-board the vehicle as a compressed gas at relatively high pressures (e.g., between 2,000 and 5,000 psig), with the required storage pressure being a function of the desired vehicular range. According to recent studies, the higher efficiencies associated with FCV's would make it possible to obtain a range of 380 mi (611.6 km) with approximately 7.9 lbs. (3.6 kg) of hydrogen stored on-board. For standard vehicular storage volumes and equipment, this requirement translates into storage pressures of 3,000 psig or greater. Accordingly, the hydrogen supplied to RFCV's must be delivered and stored at these pressures. The utilization of a PEME on board the vehicle can eliminate the need for external mechanical compression by producing electrolytic hydrogen at the desired pressures. This can be accomplished by pressurizing the hydrogen compartments in the PEME stack. In this regard, at least two approaches have been considered.

A first approach consists of balancing the pressure on both sides of the electrolytic cells. This implies that both product gas streams (hydrogen and oxygen) are delivered at high pressure. One advantage of this approach is the elimination of large mechanical stresses on the MEA due to large differential pressures across it. One disadvantage is the extra cost of the high-pressure water recirculation equipment and accessories.

A second approach consists of pressurizing the hydrogen compartments while implementing anode (i.e., oxygen side) water feed designs, and maintaining the oxygen compartments at relatively low pressure (e.g., atmospheric pressure). The advantage of this approach is the possibility of eliminating high-pressure water recirculation equipment. The disadvantages of this approach include the need for structural re-enforcement of the MEA structures, and the need for microscopic modifications to the electrode substrates. MEA reinforcement is required to maintain structural integrity so that the resulting large differential pressures do not distort the structure. Further, MEA reinforcement prevents membrane deformation or a catastrophic cell failure from occurring (e.g., by rupture of the polymeric ionic conductor). Microscopic modification of the porous electrode substrates is required to minimize or eliminate the migration of molecular hydrogen gas from the cathode compartments to the anode compartments.

Many of the engineering challenges associated with the foregoing approaches have been resolved and are disclosed in the prior art. For example, U.S. Pat. No. 5,372,689 to Carlson et al. discloses a method for membrane reinforcement in high-pressure electrolysis. Similarly, U.S. Pat. No. 5,350,496 to Smith et al. discloses a high-pressure oxygen generator. U.S. Pat. No. 5,342,494 to Shane et al. discloses a high purity hydrogen and oxygen production apparatus. However, the foregoing inventions disclose neither a connection with existing electricity and water grids, nor the integration of new water purification technologies to electrochemical hydrogen and electricity production.

The electrolytic production of hydrogen requires highly purified water. Acceptable purity levels are typically characterized by minimum values of electrical resistivity. Water with an electrical resistivity equal to or greater than 1.0 MΩ·cm is considered sufficiently pure, while higher resistivities (e.g., >14 MΩ·cm) are commonly employed in some commercial applications. Water purification has heretofore been carried out using a variety of conventional processes such as ion exchange (IE), reverse osmosis (RO), electrodialysis (EDI), electrodeposition (EDP), and filtering. Filtering and IE methods have been successfully used in some FCV demonstrations. In these methods, a mixed bed comprised of activated carbon particles is included to remove any organic compounds present in the water. Due to the unidirectional flow of unpurified water in these devices, filters and ion-exchange columns become saturated over time and must be replaced periodically. The IE media in fuel cell buses, for example, is replaced every 4 to 6 months as part of preventative maintenance programs resulting in added expense and downtime. Alternatively, the saturated IE columns may be regenerated by removing them from the system and exposing them to a flow of regeneration fluids such as concentrated solutions of acids, bases, and salts. Typically, the appropriate handling of these solutions requires dedicated facilities or specially trained personnel. In addition, column regeneration results in a significant secondary waste stream. These streams typically include used anion and cation exchange resins, contaminated solutions of high concentration, acids, bases, and salts. Some of these substances and materials can be hazardous and thus require proper recycling or disposal. Further, the energy required to pump water through porous beds of finely divided media can be significant. These requirements are typically proportional to the amount of fluid flowing through the bed and manifest themselves as large pressure drops across the beds. Accordingly, a need exists to improve deionization methods used on-board FCV's.

U.S. Pat. Nos. 5,425,858 and 5,954,937 to Farmer, which are incorporated by reference herein, disclose an alternative technology for water purification. This technology is based on a capacitive deionizing (CDI) process in which water is passed between electrodes kept at a potential difference of approximately one volt. Ions are removed from the water by the imposed electrostatic field and retained at the electrode surfaces. In addition, some metal cations are removed by electrodeposition. Electric dipoles are also attracted and trapped by the charged electrode surfaces, and small suspended particles may be removed by electrophoresis. Organic impurities also display an affinity to the carbon surfaces and can therefore be removed by chemisorption. When the electrodes become saturated in a CDI device, they are electrostatically regenerated, and the contaminants are released into a concentrated purge stream. Central to this process is a monolithic electrosorptive material such as the carbon aerogel composite materials developed by the Lawrence Livermore National Laboratory. The details for forming the carbon aerogel composite material may be found in Richardson et al., *Capacitive Deionization System*, LLNL Publication UCRL-JC-125291, October 1996, and Farmer et al., *The Application of Carbon Aerogel Electrodes to Desalination and Waste Management*, LLNL Publication UCRL-JC-127004, August 1997, which are incorporated by reference herein. Further details concerning the formation of suitable carbon aerogel composites are found in Wang, et al., *Carbon Aerogel Composite Electrodes*, J. Anal. Chem. Vol. 65, pp. 2300–2303, (1993), and in U.S. Pat. No. 5,260,855 to Pakala et al, which are incorporated by reference herein.

FIG. 6 is a cross sectional view of a CDI device 50 according to the disclosure in the Farmer patents. Intermediate electrodes 601 are positioned within a CDI stack 602 that is retained between a pair of end electrodes 603 and 604 that substantially abut insulator layers 609 and 610 that, in turn, substantially abut a pair of end plates 605 and 606. Each intermediate electrode 601 includes a pair of carbon aerogel composite layers 607 that are bonded in an electrically conducting manner to the intermediate electrodes 601. Sealing gaskets 616 are interposed between the insulator layers 609 and 610 to prevent water leakage from the device. The CDI device 50 is held in compression by the rods 611 to form a leak tight assembly.

To produce deionized water from the device 50, a potential difference is applied to each pair of adjacent electrodes 601 by connecting them to a DC power supply (not shown). As a result, an electrostatic field is generated between each pair of oppositely charged electrodes 601. City water enters the CDI stack 602 through an inlet port 614 and flows through the CDI stack 602 in the direction indicated by the arrows A through N. As the water flows through the compartments between the first pair of electrodes 601, ionic contaminants are exposed to the electrostatic field and, as a result, a fraction of these ionic species are held at the surface of the aerogel composite layers 607. Negatively charged species are attracted toward positively charged electrodes (the anodes), while positively charged species are attracted toward the negatively charged electrodes (the cathodes). This process is repeated as the water flows into the adjacent chambers and, as a result, the water stream is progressively purified. Once the desired purity level has been reached, the deionized water stream is delivered through an outlet port 615.

Still referring to FIG. 6, when the electrodes 601 become saturated with the ionic contaminants, the CDI stack 602 becomes fully charged. In contrast with conventional chemical regeneration processes, the CDI stack 602 can be regenerated by purely electrical methods. Disconnecting the DC power supply, short-circuiting the anodes and cathodes to electrically discharge all the cells, and flowing city water through the CDI stack 602 can accomplish regeneration. The CDI cells thus release the ions previously held at the charged electrodes and liberate them into the regenerating stream until the CDI cells are fully regenerated. Once this stage is reached, the deionization process may be resumed.

Farmer discloses the production of high-purity water for semiconductor processing in the foregoing manner, but does not disclose the production of high-purity water as a feedstock for water electrolysis. Furthermore, Farmer discloses neither an application of these technologies for hydrogen generation on-board vehicles, nor a method of integrating CDI stacks with PEME, PEMFC, or URFC stacks.

From the foregoing discussion, it is evident that recent developments in high-pressure PEM electrolysis, vehicular PEMFC technology, and CDI water purification have demonstrated the utility of the new technologies in many applications.

Accordingly, there is a need for a regenerative fuel cell system that includes a proton exchange membrane electrolyzer (PEME) and a proton exchange membrane fuel cell (PEMFC) to produce electrical energy, where the deionized water is supplied to the system by a CDI device. Further, there is a need for a regenerative fuel cell system that includes a unitized regenerative fuel cell (URFC) to produce electrical energy, where the deionized water is supplied to the system by a CDI device.

SUMMARY OF THE INVENTION

The present invention is directed to an apparatus and method for deionization and hydrogen fuel production in a fuel generation mode, and electricity production in a power generation mode. In one aspect of the invention, the apparatus operates in a fuel generation mode, with a capacitive deionization (CDI) device receiving water from a water source and electrical energy from a source of electrical energy to produce deionized water that is transferred to a proton electrode membrane electrolysis (PEME) device to produce hydrogen fuel by electrolysis. A storage system that is fluidly coupled to the PEME receives the hydrogen. With the apparatus operating in a power generation mode, hydrogen is transferred from the storage system to a humidification unit that humidifies the hydrogen and an oxidizer prior to combination of the hydrogen and oxygen in a proton electrode membrane fuel cell (PEMFC) device that produces electrical energy. In another aspect, the PEME and the PEMFC are functionally combined in a unitary regenerative fuel cell (URFC) device. In still another aspect of the invention, the humidification unit and the CDI are functionally combined in a single unit that uses a plurality of conductive-channeled plates as electrodes for water deionization and for reactant flows. In yet another aspect, the channeled plates are non-conductive, and a plurality of plate electrodes are used for water deionization. In a further aspect, a CDI, URFC and the humidification unit are combined in a single unitary assembly.

DETAILED DESCRIPTION OF THE INVENTION

The present invention is generally directed to an integrated power generation apparatus having a water deionization system for the production of deionized water that is operatively coupled to an electrolytic hydrogen generator to produce hydrogen by electrolysis and having a fuel cell device for electricity production. Many of the specific details of certain embodiments of the invention are set forth in the following description and in FIGS. 7 through 13 to provide a thorough understanding of such embodiments. One skilled in the art will understand, however, that the present invention may have additional embodiments, or that the present invention may be practiced without several of the details described in the following description. Moreover, in the following description of the embodiments, unless specific reference is made to deionized water, it is understood that the water is in a relatively untreated or unprocessed state, as would be received, for example, from a municipal water distribution system.

Figure 1:
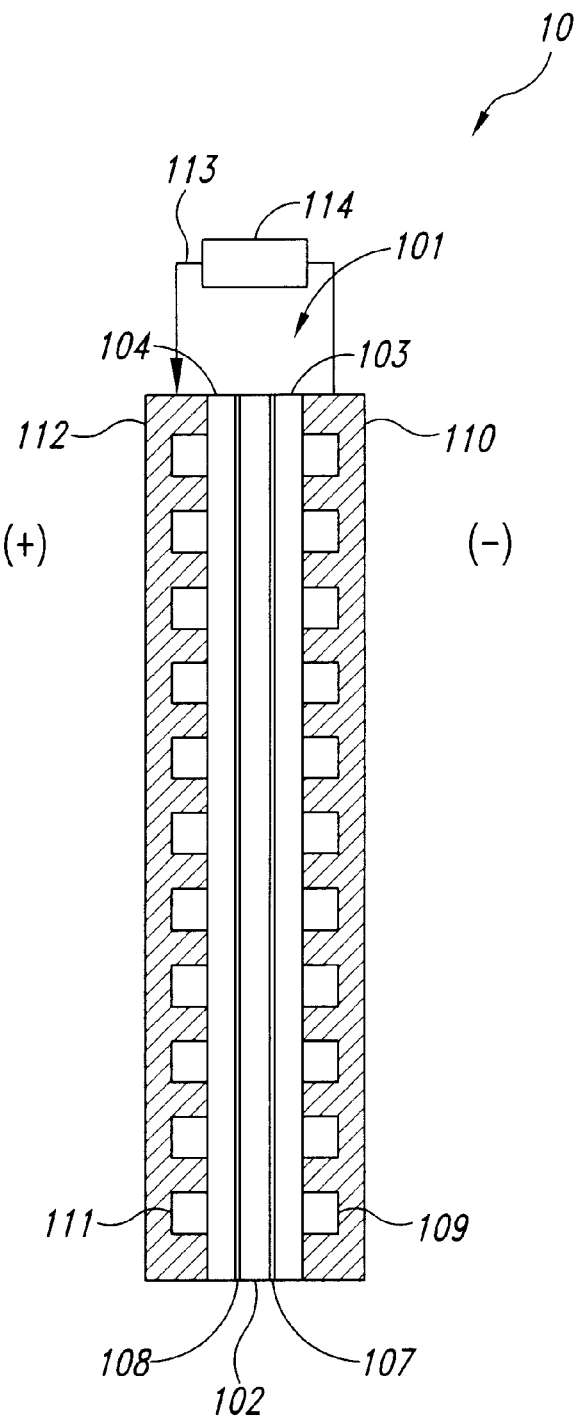
FIG. 1 is a cross sectional, schematic view of a proton exchange membrane fuel cell (PEMFC) according to the prior art.
Figure 2:
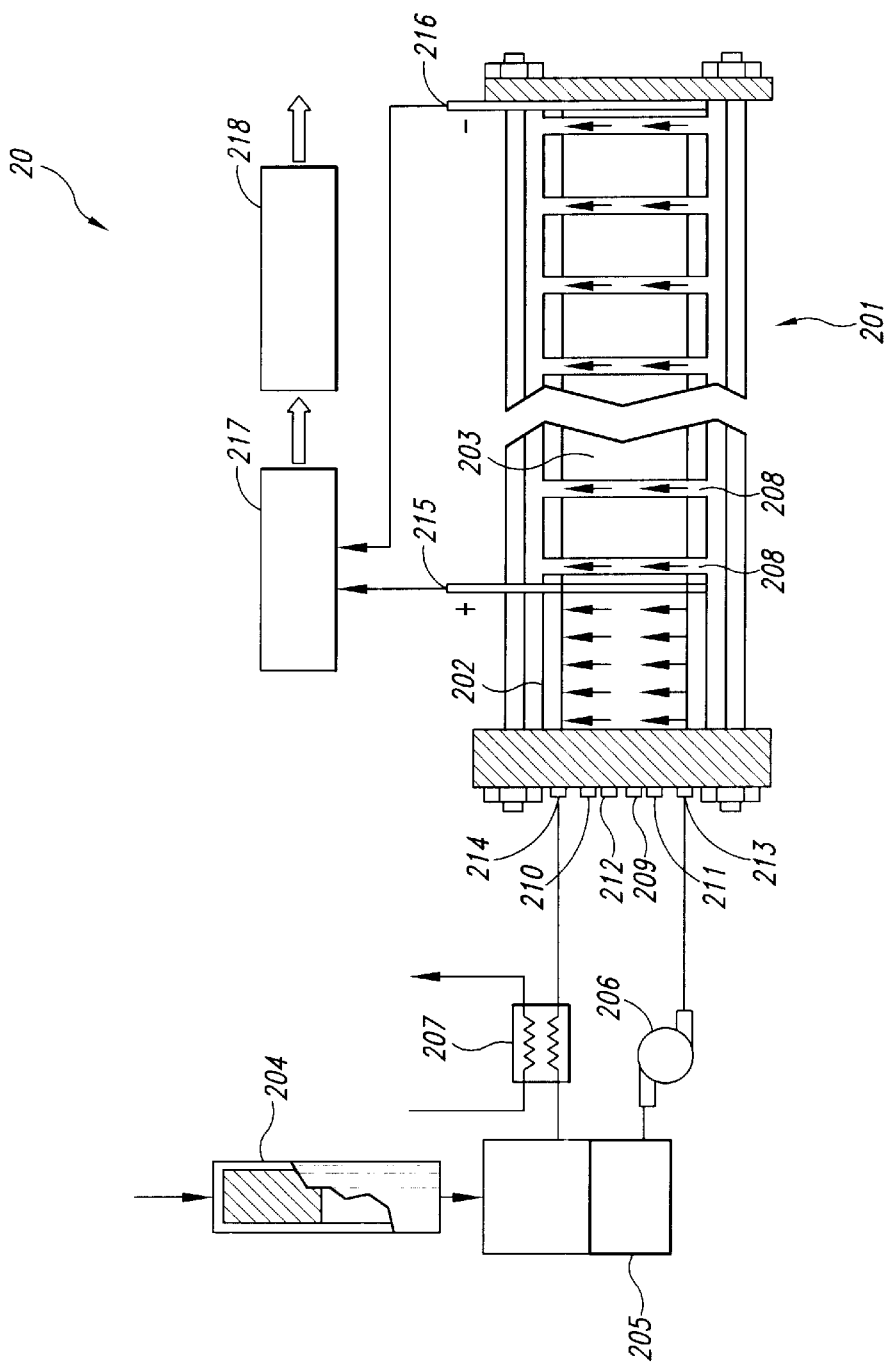
FIG. 2 is a cross sectional, schematic view of a PEMFC device that utilizes an internal module for humidification of the reactants according to the prior art.
Figures 3, 4:
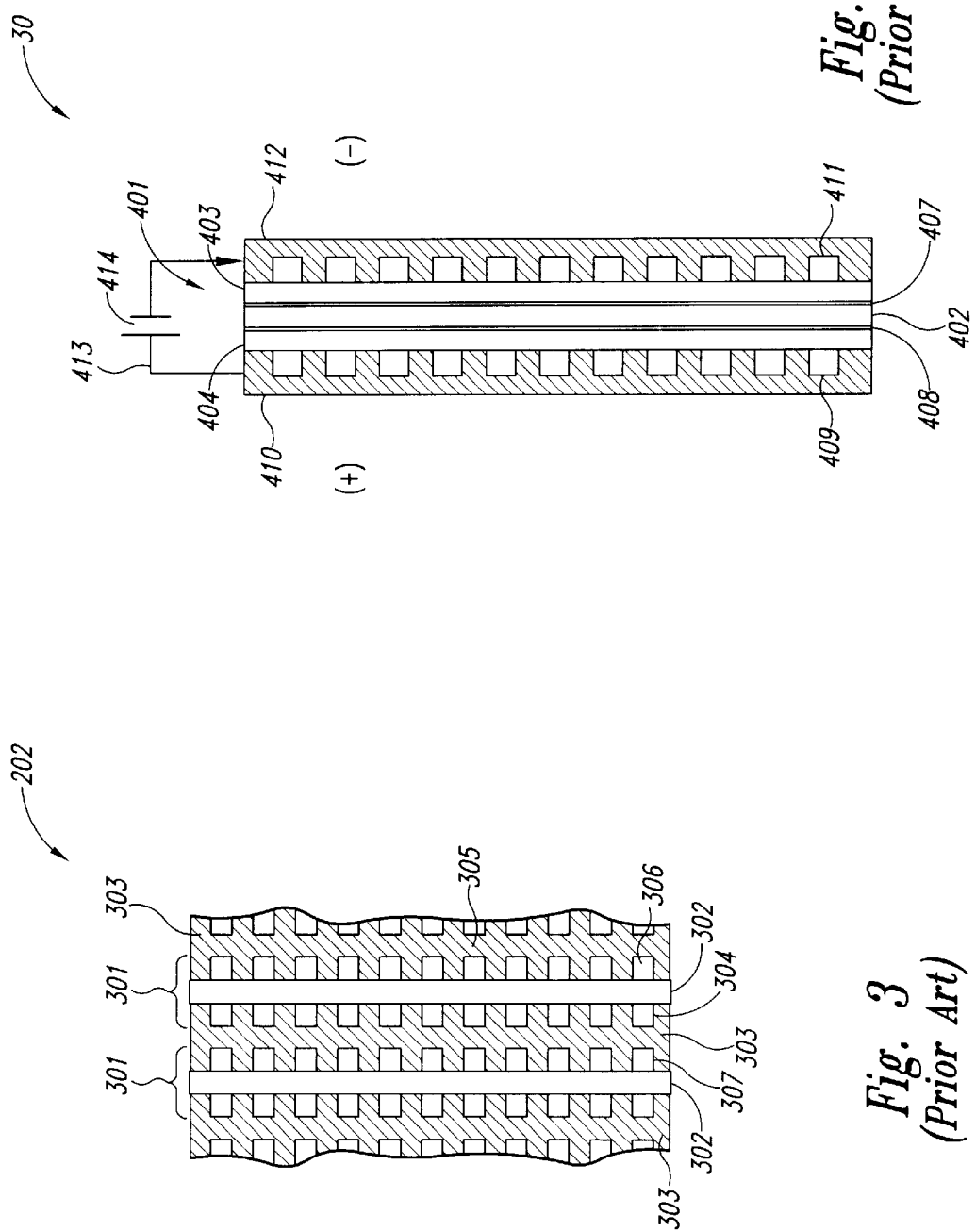
FIG. 3 is a partial cross sectional view of an internal humidification module according to the prior art.
FIG. 4 is a cross sectional, schematic view of a proton exchange membrane electrolytic cell (PEME) according to the prior art
Figure 5:
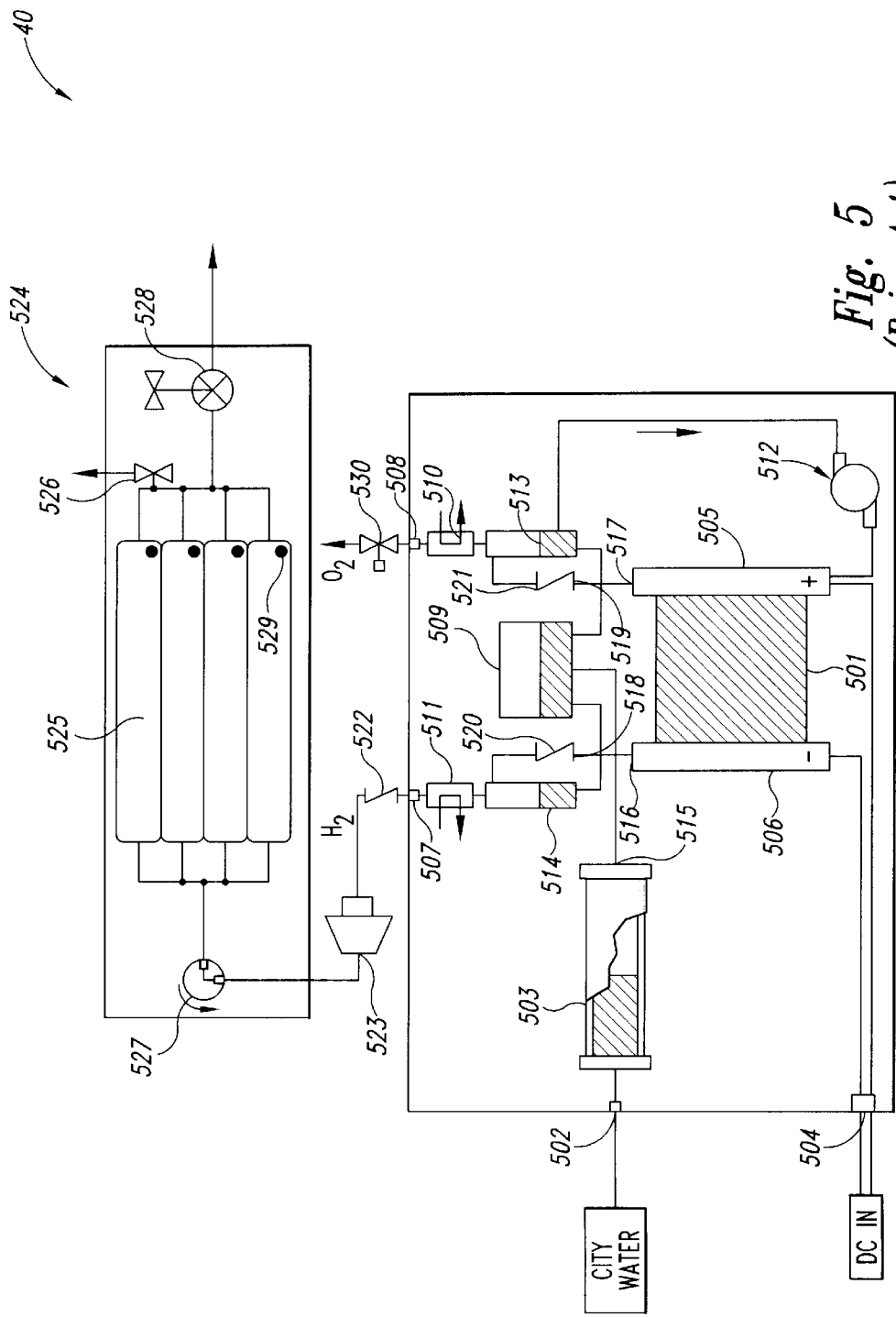
FIG. 5 is a schematic view of a PEME system according to the prior art.
Figure 6:
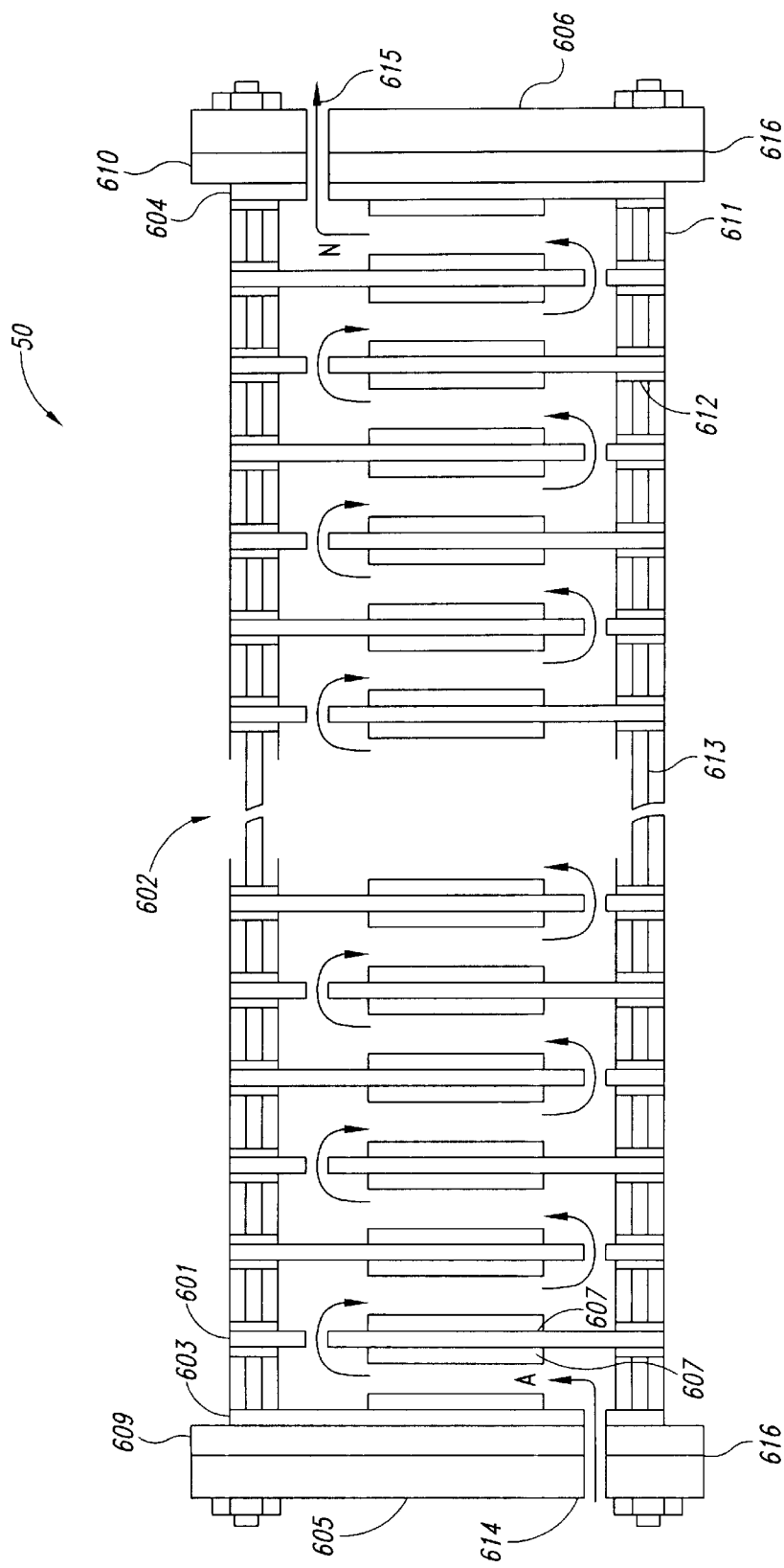
FIG. 6 is a cross sectional view of a capacitive deionization (CDI) device according to the prior art.
Figure 7:
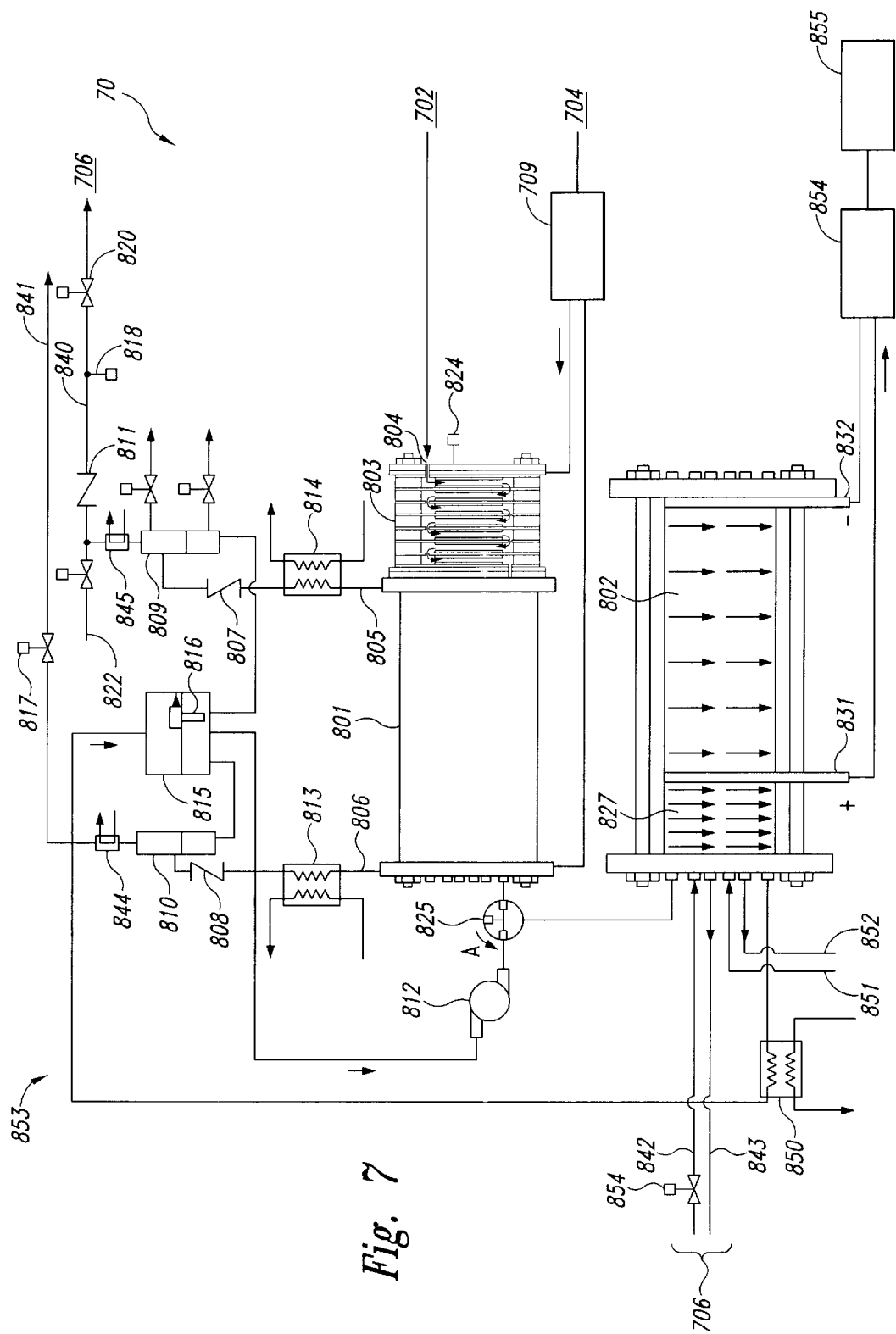
FIG. 7 is a schematic diagram of an integrated power generation apparatus according to an embodiment of the invention.

FIG. 7 is a schematic diagram of an integrated power generation apparatus 70 according to an embodiment of the invention. The apparatus 70 is comprised of a PEME stack 801, a PEMFC stack 802, and a CDI stack 803 that are operatively coupled to produce hydrogen fuel from a water source during a fuel generation mode, and electricity and water during a power generation mode. The internal details and operation of the PEME stack 801, the PEMFC stack 802, and the CDI stack 803 have been previously described, and thus, for the sake of brevity, will not again be described in detail.

In the fuel generation mode, water is delivered to the CDI stack 803 from an input source 702. The source 702 may be either a potable or non-potable source, but is generally a municipal water source. The water flow rate should be at least sufficient to match the rate of water consumption in the PEME stack 801. However, larger flow rates may be required to accommodate cooling requirements, and to compensate for evaporation and other forms of water loss. The water enters the CDI stack 801 and is progressively deionized as it passes through the stack 803. Once the water stream has reached a predetermined purity level, it is delivered to the PEME stack 801. In order to decompose the deionized water into hydrogen and oxygen, electrical current must be applied to the PEME stack 801. The apparatus 70 therefore receives electrical current from an external source 704. Since the electrical current received from the external source 704 may not be compatible with the electrical requirements of the PEME stack 801, a power converter 709 is interposed between the source 704 and the apparatus 70 to ensure electrical compatibility. For example, if the source 704 is a utility grid that provides an alternating current, the converter 709 provides an appropriate direct current to the PEME stack 801 at a compatible voltage. Accordingly, the converter 709 may include transformers, rectifiers, or other power conditioning apparatus as required.

During the fuel generation mode, two-phase mixtures of hydrogen and water 805, and oxygen and water 806 generated by electrolysis in the stack 801 are collected and flow out of the PEME stack 801 through heat exchangers 813 and 814, which remove heat present in the two-phase mixtures 805 and 806 incurred by the electrolytic processes within the stack 801. The heat exchangers 813 and 814 may be cooled by water supplied from the source 702, or alternatively, the heat exchangers 813 and 814 may be cooled by air, or other gases. Check valves 807 and 808 receive the mixtures 805 and 806 from the heat exchangers 813 and 814 and prevent the two-phase mixtures 805 and 806 from returning to the PEME stack 801. A water-hydrogen phase separator 809, and a water-oxygen phase separator 810 separate the liquid and gaseous components in the two-phase mixtures 805 and 806. The deionized water collected at the water-oxygen phase separator 810 and the water-hydrogen phase separator 809 may be deposited in a water level controller reservoir 815 and stored for further use. A floating level sensor 816 may monitor the water level in the reservoir 815. Additionally, a heat exchanger 844 may be used to remove residual water vapor in the gas leaving the water-oxygen phase separator 810, and a similar heat exchanger 845 may be used to remove residual water vapor in the gas leaving the water-hydrogen phase separator 809.

The oxygen generated by the PEME stack 801 may then be vented through a leak valve 817 located in line 841, or accumulated in a storage system (not shown) that may include a compressor that receives the oxygen from the PEME stack 801 and transfers the compressed oxygen to a plurality of storage vessels. The apparatus 70 may transfer the hydrogen fuel generated in the PEME stack 801 to a fuel storage system 706 through a fuel storage line 840. The fuel storage system 706 may store hydrogen as a compressed gas, or alternatively, as a metal hydride. As the total internal pressure within the fuel storage system 706 increases, the pressure is monitored by a pressure sensor 818 in the line 840 that is coupled to a control system (not shown). When a predetermined gas storage pressure within the system 706 has been achieved, the sensor 818 transfers a signal to the control system and the electrolytic processes within the PEME stack 801 are halted by disconnecting the DC power supplied by the converter 709 from the PEME stack 801. Once the fuel generation is completed, the PEME stack 801 may be depressurized by closing a valve 820 on the hydrogen supply line, and venting a small amount of hydrogen fuel though a regulated leak valve 821 connected to a hydrogen vent line 822.

Still referring to FIG. 7, with the apparatus 70 still operating in the fuel generation mode, a pump 812 pumps deionized water from the reservoir 815 to the PEME stack 801 through a two-position valve 825. As shown in FIG. 7, the valve 825 directs deionized water from the reservoir 815 to the PEME stack 801. The water pumped from the reservoir 815 may be the sole source of deionized water supplied to the PEME stack 801, or it may be used to supplement the deionized water provided by the CDI stack 803. In the present embodiment, an anode-feed design is used, with water being fed to the oxygen side of the electrolysis cells within the PEME stack 801. However, other water-feed methods, such as static feed or cathode feed may be used in the present embodiment. With the anode water feed design, the pressure in the oxygen compartments in the PEME stack 801 may be maintained at a pressure level that is lower than the pressure in the hydrogen compartments in the PEME stack 801. This "imbalanced pressure design" eliminates high-pressure water recirculation equipment (pumps, fittings, etc) on the anode (oxygen) side of each electrolytic cell in the PEME stack 801, since this side may be maintained at a pressure that is relatively close to atmospheric pressure. However, large differential pressures across the MEA structures within the PEME stack 801 may be developed, and consequently, MEA structures in the imbalanced pressure stack design must be re-enforced to withstand pressure differentials created by the hydrogen pressurization. Other designs, however, are possible. For example, the hydrogen compartments may not be pressurized, so that the low-pressure hydrogen is delivered to a mechanical compression system (not shown) before being transferred to the fuel storage system 706.

By producing hydrogen fuel at low pressure, the need for high-pressure recirculation and sealing equipment is eliminated. Alternatively, both sides of the electrolytic cells in the PEME stack 801 may be simultaneously pressurized to achieve a predetermined hydrogen fuel delivery pressure. In this "balanced pressure" design, the high pressure PEME stack 801, the PEMFC stack 802 and the CDI stack 803 are enclosed in a suitable containment vessel, with feedthroughs through the containment vessel for electrical and fluid connections. In this design, the water supplied from the source 702 must be increased in pressure so that it generally exceeds the containment pressure. Still another balanced pressure design is implemented with a pair of water recirculation loops, each loop supplying recirculated water to one of the product gas compartments. The balanced pressure PEME design is advantageous because it balances the pressure across the gas compartments, thus eliminating the need for MEA reinforcement.

After each fuel generation, a sensor 824 determines the saturation level of the electrosorptive media in the electrodes within the CDI stack 803, and acts as a triggering device to activate a control system (not shown) that controls regeneration of the CDI stack 803. Accordingly, the regeneration process may be initiated when the electrodes are fully saturated, or alternatively, regeneration may be controlled to occur after every fuel generation cycle. The sensor 824 may be a pH sensor, but other devices may be used. For example, the sensor 813 may be a conductivity sensor, an ion-selective sensor, a polarographic sensor, an impedance sensor, an optical transmission sensor, or a light scattering sensor. A suitable control system is disclosed in U.S. Pat. Nos. 5,425,858 and 5,954,957 to Farmer, both of which are incorporated by reference.

Still referring to FIG. 7, and turning now to the power generation mode, the two-position valve 825 is positioned by rotating the valve 825 in the direction "A" to establish a recirculating water loop 853 that extends from the reservoir 815 through the pump 812 and into a humidification module 827 in the PEMFC stack 802. The water leaving the PEMFC stack 802 is then routed through a heat exchanger 850 before being routed to the reservoir 815. The heat exchanger 850 removes heat from the water that may be imparted by the electrochemical processes occurring within the PEMFC stack 802. The heat exchanger 850 may be cooled by water supplied from the source 702, or alternatively, the heat exchanger 850 may be cooled by air, or other gases. Hydrogen from the fuel storage system 706 is delivered to the PEMFC stack 802 by a fuel delivery line 842 that is connected to the system 706. The line 842 further includes a pressure regulator 854 to permit delivery of the fuel to the PEMFC stack 802 at the proper pressure.

Excess hydrogen is removed from the PEMFC stack 802 through a hydrogen return line 843, and returned to the fuel storage system 706. An oxygen-containing oxidizer stream is delivered to the PEMFC stack 802 through an oxidizer inlet line 851, with excess oxidizer being removed from the PEMFC stack 802 through an oxidizer outlet line 852. Electrodes 831 and 832 permit electrical current produced by the PEMFC stack 802 to be transferred to an electrical converter 854 capable of converting the DC output of the stack 802 to other voltages and modes as required by an electrical load 855. The converter 854 may be comprised of transformers, rectifiers, or other power conditioning apparatus as required to couple the apparatus 70 to the electrical load 855. The electrical load 855 may be comprised of an electrical drive motor to provide motive power to a regenerative fuel cell vehicle (RFCV). Alternatively, the load 855 may be an electrical utility grid, an electrical storage device, such as a plurality of interconnected storage batteries, or other remote electrical power consumers.

The combination of a CDI stack with a PEME stack and a PEMFC stack into an integrated system for use in an integrated power generation apparatus advantageously allows energy requirements for water deionization to be reduced by using electrical rather than chemical methods, such as ion-exchange methods. Additionally, the requirement for a unidirectional ion-exchange bed is eliminated by replacing them with a bidirectional CDI stack, which occupies the same space for deionization and regeneration functions, and thus allows power generation systems to be more compact than systems having competing deionization methods. Further, since the regeneration process uses electrical means for regeneration, the chemicals typically used in the regeneration of ion exchange beds is eliminated. Therefore, the generation of secondary waste streams produced during the regeneration of ion-exchange beds is also eliminated. The CDI stack structure may also be easily integrated into a PEME stack, since the structure of the CDI, PEME and PEMFC stacks are similar. This similarity in structure may afford certain cost savings to manufacturers.

The ability to supply electrical power, deionized water, and to generate and store fuel may be very important in remote locations, in isolated environments, or in space applications. In mobile applications, for example, the combination of PEME and PEMFC stacks with a CDI stack advantageously permits maintenance costs and vehicular downtime to be reduced by removing the requirement for periodic replacement of water deionization media. Further, unlike conventional deionization methods, which offer different levels of deionization performance at the beginning and end of their maintenance periods, CDI stacks provide the same level of performance over the lifetime of the vehicle. This is possible because the CDI stacks can be regenerated to their initial performance level without removal or replacement of the working electrosorptive materials and components. Because CDI stacks may be designed to consist of substantially open structures, the pressure drop across a CDI stack is significantly smaller that the pressure drop required for recirculation of a fluid through a bed of finely divided, porous media. In a vehicle, such reduction is important because parasitic loads such as pumps, fans, lights, and compressors have a significant impact on overall vehicular efficiency. In a fuel cell bus, for example, the parasitic load due to the oxidizer compression system can be up to 20% of the total power output from the PEMFC stack. Reducing the parasitic loads means that more power can be devoted to vehicle propulsion or, alternatively, that smaller vehicular power plants can be used.

Figure 8:
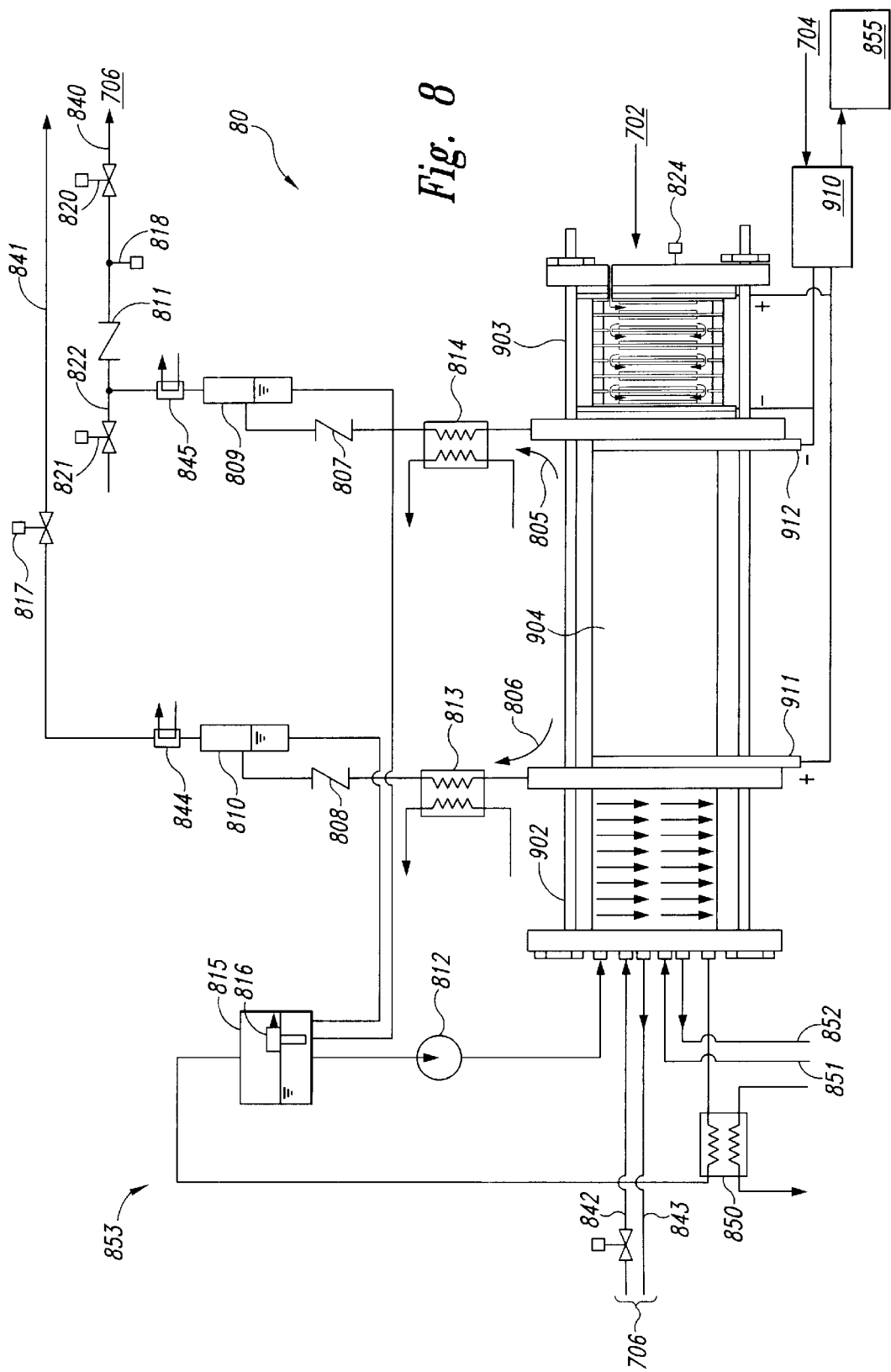
FIG. 8 is a schematic diagram of an integrated power generation apparatus 80 according to another embodiment of the invention.

FIG. 8 is a schematic diagram of an integrated power generation apparatus 80 according to another embodiment of the invention. The apparatus 80 is comprised of a URFC stack 901 that functionally combines the PEME stack 801 and PEMFC stack 802 disclosed in the previous embodiment. The internal details and operation of a URFC have been previously described. Thus, for the sake of brevity, the URFC will not be described again. The URFC stack 901 is further comprised of an active region 904 that may be used to decompose water into hydrogen and water by electrolysis, and also may be used to produce electricity by operating as a fuel cell. Accordingly the apparatus 80 may be operated in a fuel generation mode and a power generation mode. The active region 904 is positioned between an internal humidification module 902 to condition the reactants entering the active region 904 when the apparatus is operating in the power generation mode, and a CDI stack 903 that delivers deionized water to the active region 904 when the apparatus is operating in the fuel generation mode.

With the apparatus 80 operating in the fuel generation mode, water is delivered to the CDI stack 903 from an input source 702, and is progressively deionized as it passes through the stack 903. Once the water stream has reached a predetermined purity level, it is delivered to the URFC stack 901. In order to decompose the deionized water into hydrogen and oxygen, electrical current must be applied to the URFC stack 901. The apparatus 80 therefore receives electrical current from an external source 704. Since the electrical current received from the external source 704 may not be compatible with the electrical requirements of the URFC stack 901, a power converter 910 is interposed between the source 704 and the apparatus 80 to ensure electrical compatibility.

When operating in the fuel generation mode, two-phase mixtures of hydrogen and water 805, and oxygen and water 806 are generated by electrolysis in the stack 901, which are collected and flow out of the URFC stack 901 through heat exchangers 813 and 814. Check valves 807 and 808 receive the mixtures 805 and 806 from the heat exchangers 813 and 814 to prevent the two-phase mixtures 805 and 806 from returning to the URFC stack 901. A water-hydrogen phase separator 809, and a water-oxygen phase separator 810 separate the liquid and gaseous components in the two-phase mixtures 805 and 806. The deionized water collected at the water-oxygen phase separator 810 and the water-hydrogen phase separator 809 may be deposited in a water level controller reservoir 815 and stored for further use. A floating level sensor 816 may monitor the water level in the reservoir 815. Additionally, a heat exchanger 844 may be used to remove residual water vapor in the gas leaving the water-oxygen phase separator 810, and a similar heat exchanger 845 may be used to remove residual water vapor in the gas leaving the water-hydrogen phase separator 809.

The oxygen generated by the URFC stack 901 may be vented through a leak valve 817 located in line 841, or accumulated in a storage system (not shown) that may include a compressor that receives the oxygen from the URFC stack 901 and transfers the compressed oxygen to a plurality of storage vessels. The apparatus 80 may transfer the hydrogen fuel generated in the URFC stack 901 to a fuel storage system 706 through a fuel storage line 840. As the total internal pressure within the fuel storage system 706 increases, a pressure sensor 818 in the line 840 may be used to provide a signal to a control system (not shown) to indicate that the maximum gas storage pressure within the system 706 has been achieved. The control system may then interrupt the processes within the URFC stack 901 by disconnecting the DC power supplied by the converter 910 from the URFC stack 901. Once the fuel generation is completed, the URFC stack 901 may be depressurized by closing a valve 820 on the hydrogen supply line 840, and venting a small amount of hydrogen fuel though a regulated leak valve 821 connected to a hydrogen vent line 822. After each fuel generation, a sensor 824 may be used to determine the saturation level of the electrosorptive media in the electrodes within the CDI stack 903 to determine if regeneration is required.

In the power generation mode of operation of the apparatus 80, a recirculating water loop 853 extends from the reservoir 815 through a pump 812 and into a humidification module 902 in the URFC stack 901 to provide deionized water to the module 902 for humidification of the reactants. Excess water leaving the URFC stack 901 may be routed through a heat exchanger 850 before being returned to the reservoir 815. Hydrogen from the fuel storage system 706 is delivered to the URFC stack 901 by a fuel delivery line 842 that is connected to the system 706. The line 842 further includes a pressure regulator 854 to permit delivery of the fuel to the URFC stack 901 at the proper pressure.

Excess hydrogen may be removed from the URFC stack 901 through a hydrogen return line 843, and returned to the fuel storage system 706. An oxygen-containing oxidizer stream is delivered to the URFC stack 901 through an oxidizer inlet line 851, with excess oxidizer being removed from the URFC stack 901 through an oxidizer outlet line 852. Electrodes 911 and 912 permit electrical current produced by the URFC stack 901 to be transferred to the electrical converter 910 to convert the DC output of the stack 901 to other voltages and modes as required by an electrical load 855.

The combination of a CDI stack with a URFC stack in the apparatus 80 allows an integrated power generation apparatus to be formed that has fewer discrete components than the apparatus 70 as shown in FIG. 7, since the functionality of the PEME stack and the PEMFC stack have been combined in the URFC stack. Accordingly, the present embodiment may have inherently less weight while maintaining a power output that is comparable to the apparatus 70.

Figure 9:
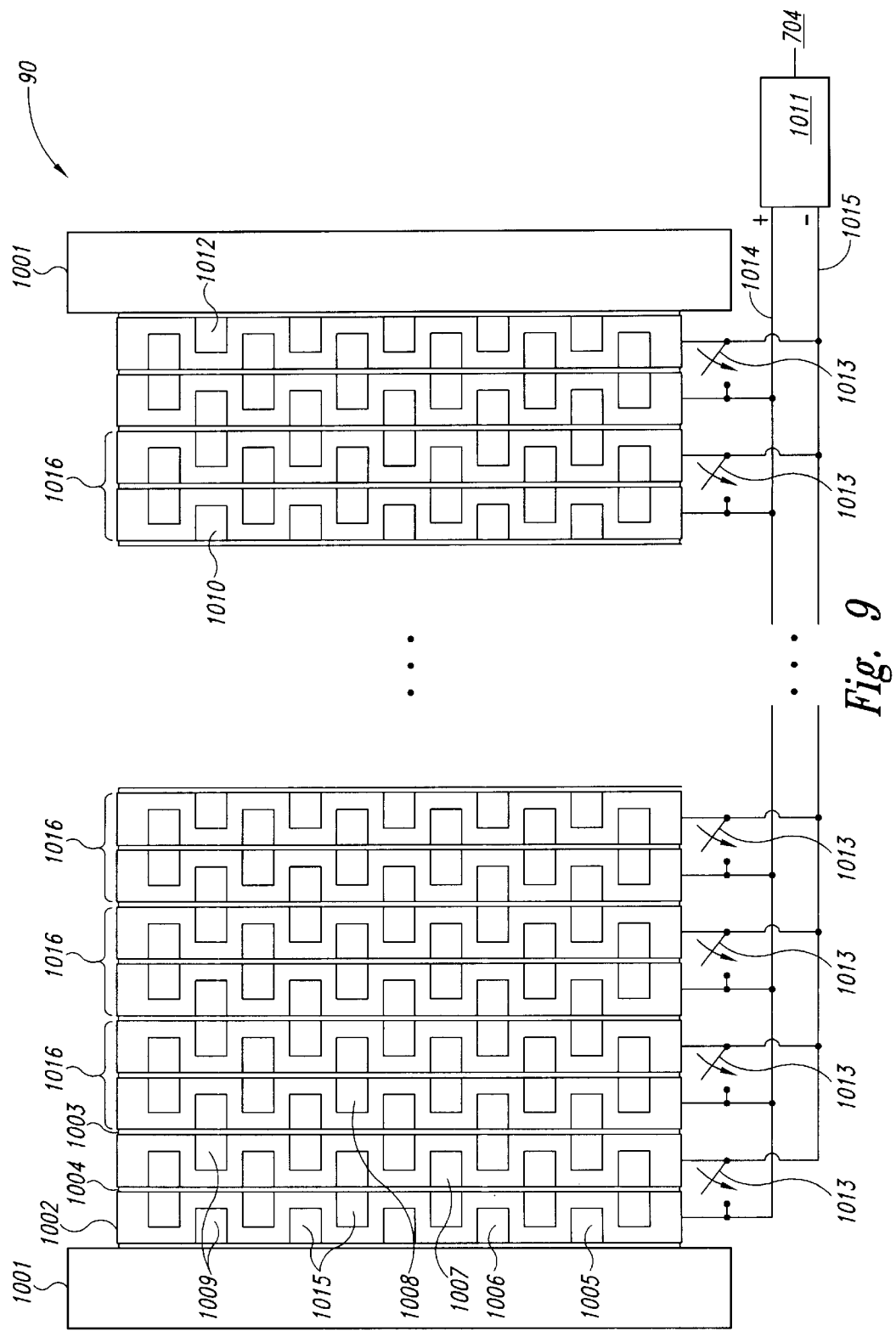
FIG. 9 is a partial, cross sectional view of an integrated CDI apparatus for water deionization and reactant conditioning according to an embodiment of the invention.

FIG. 9 is a partial, cross sectional view of an integrated CDI apparatus 90 for water deionization and reactant conditioning that may be utilized in the apparatus 70 of FIG. 7, and the apparatus 80 of FIG. 8, according to one embodiment of the invention. A plurality of plates 1002 having a plurality of undulating (in cross section) and repetitively spaced channels 1015 each having an open side are positioned between a pair of fluid impermeable sidewalls 1001. The plates 1002 are comprised of an electrically conductive and fluid impermeable material, such as a non-ferrous metal or metal alloy. The channels 1015 may be formed by pressing, rolling, casting or machining the channels into the plate 1002. Further, the channels 1015 may have different cross-sectional areas, and may have either equal or unequal aspect ratios. The channels 1015 may further vary in cross-sectional area along the length of the channels 1015. The plates 1002 are arranged within the apparatus 90 in repetitive groups 1016 that consist of a pair of plates 1002 that have alternating pairs of channels 1015 in each of the plates 1002 with the open sides substantially in apposition, with the adjacent pair of channels 1015 having open sides in opposition. Each of the groups 1016 further has a centrally positioned membrane 1004 that is comprised of a suitable water permeable and non-conductive material. Each respective group 1016 is separated from the other adjoining groups 1016 by a pair of water impermeable and electrically non-conductive membranes 1003. A power supply 1011 provides DC current to each of the groups 1016 through a bus 1014 that is coupled to one polarity of the supply 1011, and a bus 1015 that is coupled to the opposite polarity. Although the groups 1016 are shown with a parallel electrical interconnection to the supply 1011, a series electrical interconnection may also be used. The power supply 1011 receives electrical current from an electrical source 704. Each group 1016 is further comprised of a switch 1013 that permits the plates 1002 in the group to be electrically coupled when the switch 1013 is moved to the closed position.

Still referring to FIG. 9, within each respective group 1016, the channels 1015 that have open sides in opposition have an electrosorptive layer 1009 deposited on the walls of the channels 1015. The electrosorptive layer 1009 may be formed from the carbon aerogel composite material described earlier, which is applied to the walls of the channels 1015 by a conductive epoxy material. Water is delivered to the channels 1015 that are lined with the electrosorptive layer 1009 by manifolds (not shown) that are coupled to each end of the apparatus 90 that direct water flow through the channels 1015 in a direction normal to FIG. 9. However, the channels 1015 may be arranged to follow a straight flow path, a parallel flow path, a serpentine path, or any other pattern suitable for the particular application. With current from the power supply 1011 applied to the apparatus 90, and water traversing the length of the channels 1015, the electrosorptive layers 1009 in the channels 1015 attracts the charged ions to the layers 1009 disposed on the walls of the channels 1015, thus deionizing the water passing through the channels 1015. When the layers 1009 approach an absorptive capacity, regeneration of the layers 1009 within the channels 1015 is achieved by decoupling the power supply 1011 from each group 1016, closing the switches 1013, and circulating a flow of water in the apparatus 90 to flush the ions from apparatus 20.

The conditioning of the gas reactants within the apparatus 90 is accomplished by directing the deionized water generated within the apparatus 90 through one side of the apposed channels 1015 and directing the gas reactants through the other apposed side. Since the fluid permeable membrane 1004 separates the deionized water and the gas reactants, the deionized water may migrate across the membrane 1004 to progressively humidify the gas reactants as they flow through the apparatus 100. The flow pattern for the gas reactants in the apparatus 90 may require redirection within the apparatus 90 in a serpentine flow pattern to increase the residence time of the reactants within the apparatus 90.

Figure 10:
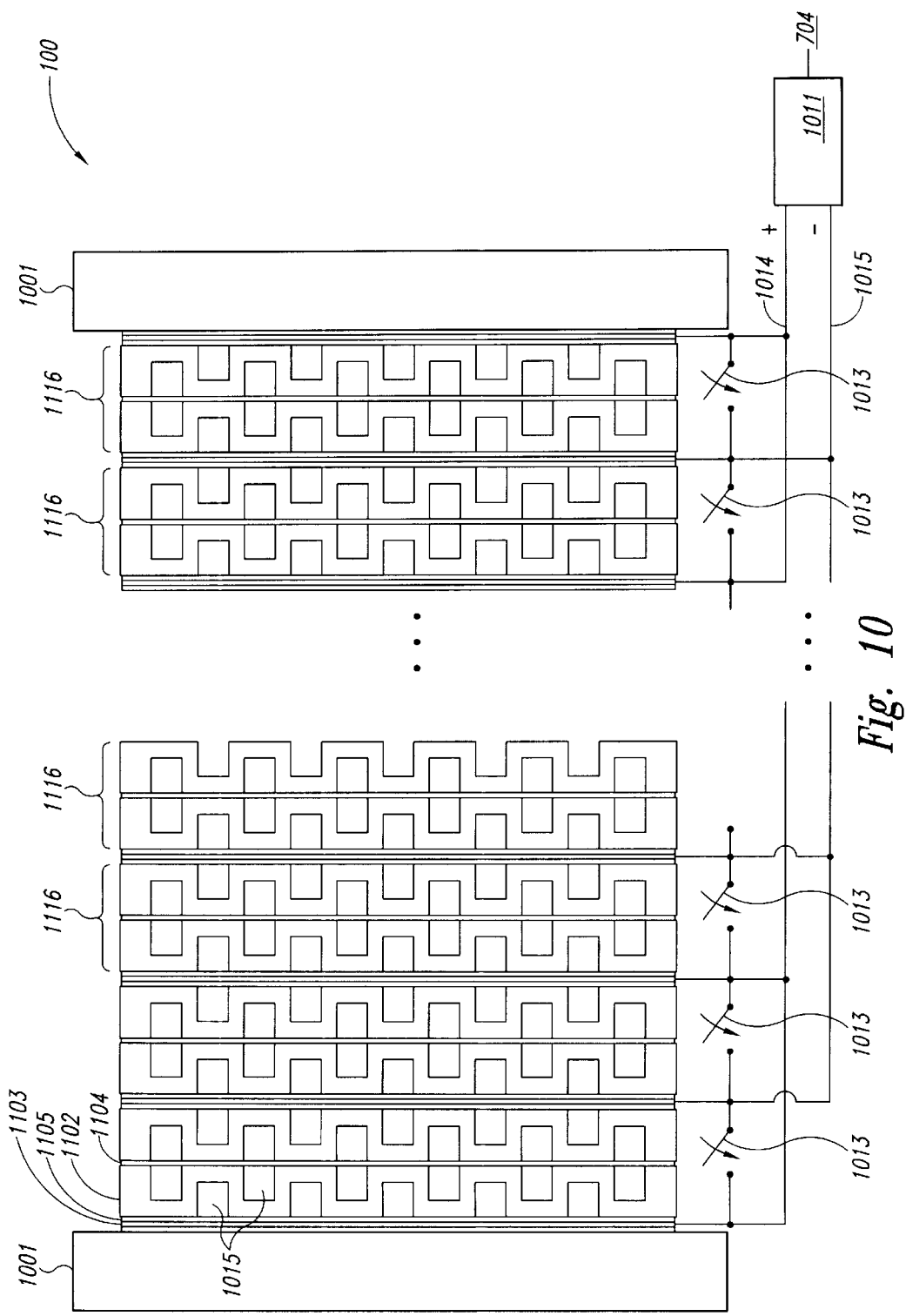
FIG. 10 is a partial, cross sectional view of an integrated CDI apparatus for water deionization and reactant conditioning according to another embodiment of the invention.

FIG. 10 is a partial, cross sectional view of an integrated CDI apparatus 100 for water deionization and reactant conditioning that may be used in the apparatus 70 as shown in FIG. 7, and in the apparatus 80, as shown in FIG. 8, according to another embodiment of the invention. A plurality of plates 1102 having a plurality of undulating (in cross section) and repetitively spaced channels 1015 each having an open side and positioned between a pair of fluid impermeable sidewalls 1001. The plates 1102 are comprised of an electrically insulative and fluid impermeable material, such as a thermoplastic or thermosetting resin, or other polymers. The channels 1015 may be formed by casting, thermoforming, or machining the channels into the plate 1102. The plates 1102 are arranged within the apparatus 100 in repetitive groups 1116 that consist of a pair of plates 1102 that have alternating pairs of channels 1015 in each of the plates 1102 having open sides substantially in apposition, with the adjacent pair of channels 1015 having the open sides in opposition. Each of the groups 1116 further has a centrally positioned membrane 1104 that is comprised of a suitable water permeable and non-conductive material. Each respective group 1016 is separated from the other adjoining groups 1016 by a pair of water impermeable and electrosorptive layers 1105. The electrosorptive layers 1105 may be comprised of a carbon aerogel composite, although other alternatives exist. A planar electrode 1103 is interposed between each group 1016, so that each of the planar electrodes 1103 electrically contacts the electrosorptive layers 1105. A power supply 1011 provides DC current to each of the groups 1016 through a bus 1014 that is coupled to one polarity of the supply 1011, and a bus 1015 that is coupled to the opposite polarity. Although the groups 1016 are shown with a parallel electrical interconnection to the supply 1011, a series electrical interconnection may also be used. The power supply 1011 receives electrical current from an electrical source 704. Each group 1016 is further comprised of a switch 1013 that permits the plates 1102 in the group to be electrically coupled when the switch 1013 is moved to the closed position.

In the apparatus 100, water is delivered to the channels 1015 that are in facial contact with the electrosorptive layers 1105 by manifolds (not shown) that are coupled to each end of the apparatus 100 that direct water flow through the channels 1015 in a direction normal to FIG. 10. The channels 1015 may be arranged to follow a straight flow path, a parallel flow path, a serpentine path, or any other pattern suitable for the particular application. With current from the power supply 1011 applied to the apparatus 100, and water traversing the length of the channels 1015, the portion of the electrosorptive layers 1105 that are exposed to the water flowing in the channels 1015 attracts the charged ions from the water to the layers 1105, thus deionizing the water passing through the channels 1015. When the portions of the layers 1105 exposed to the water flow approach an absorptive capacity, regeneration of the layers 1105 is achieved by decoupling the power supply 1011 from each group 1016, closing the switches 1013, and circulating a flow of water in the apparatus 100 to flush the ions from apparatus 20.

The conditioning of the gas reactants within the apparatus 100 is accomplished by directing the deionized water generated within the apparatus 100 through one side of the apposed channels 1015 and directing the gas reactants through the other apposed side. Since the fluid permeable membrane 1104 separates the deionized water and the gas reactants, the deionized water may migrate across the membrane 1104 to progressively humidify the gas reactants as they flow through the apparatus 100. The flow pattern for the gas reactants in the apparatus 100 may require redirection within the apparatus 100 in a serpentine flow pattern to increase the residence time of the reactants within the apparatus 100.

The CDI apparatus 90 of FIG. 9 and the CDI apparatus of FIG. 10 combine the functionality of a CDI module with a humidification module in a unitary device that may be used to provide deionized water for fuel production while conditioning the reactant streams through humidification. The functions thus combined may be conducted simultaneously, or alternatively, at different times. The CDI apparatus 90 and 100 thus permit an overall reduction in the weight of the system by combining the CDI module and the humidification module in a single unit.

Figure 11:
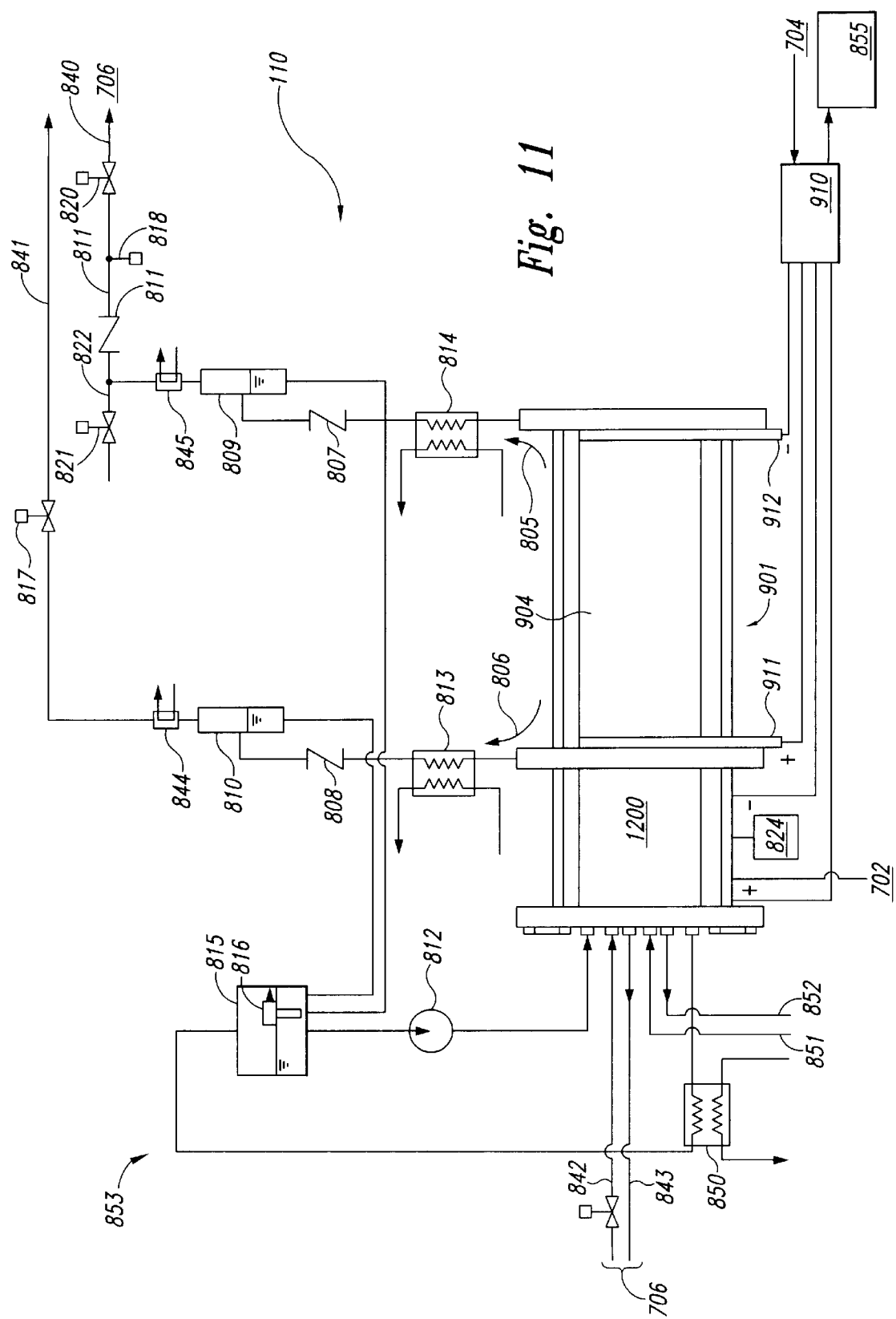
FIG. 11 is a schematic diagram of an integrated power generation apparatus according to still another embodiment of the invention.

FIG. 11 is a schematic diagram of an integrated power generation apparatus 110 according to still another embodiment of the invention. The apparatus 110 is comprised of a URFC stack 901 as disclosed in the embodiment described in connection with FIG. 8. The internal details and operation of a URFC have been previously described, and thus, for the sake of brevity, will not again be described in detail. The URFC stack 901 is further comprised of an active region 904 that may be used to decompose water into hydrogen and water by electrolysis, and also may used to produce electricity by operating as a fuel cell, as previously described. The active region 904 is positioned adjacent to an integrated CDI assembly 1200 as disclosed in the embodiments described in connection with FIGS. 9 and 10. The module 1200 may therefore generate deionized water from a water source 702 for the electrolytic generation of hydrogen and oxygen in the stack active region 904 when operating in the fuel generation mode, and condition the reactants entering the active region 904 by humidification of the reactants during the power generation mode.

With the apparatus 110 operating in the fuel generation mode, water is delivered to the integrated CDI assembly 1200 from an input source 702, and is progressively deionized as it passes through the assembly 1200. Once the water stream has reached a predetermined purity level, it is delivered to the URFC stack 901. Electrical current is applied to the URFC stack 901 from an external source 704. Since the electrical current received from the external source 704 may not be compatible with the electrical requirements of the URFC stack 901, a power converter 910 is interposed between the source 704 and the apparatus 110 to ensure electrical compatibility.

With the apparatus 110 still operating in the fuel generation mode, two-phase mixtures of hydrogen and water 805, and oxygen and water 806 are generated by electrolysis in the stack 901, which are collected and flow out of the URFC stack 901 through heat exchangers 813 and 814. Check valves 807 and 808 receive the mixtures 805 and 806 from the heat exchangers 813 and 814 to prevent the two-phase mixtures 805 and 806 from returning to the URFC stack 901. A water-hydrogen phase separator 809, and a water-oxygen phase separator 810 separate the liquid and gaseous components in the two-phase mixtures 805 and 806. The deionized water collected at the water-oxygen phase separator 810 and the water-hydrogen phase separator 809 may be deposited in a water level controller reservoir 815 and stored. A floating level sensor 816 may monitor the water level in the reservoir 815. Additionally, a heat exchanger 844 may be used to remove residual water vapor in the gas leaving the water-oxygen phase separator 810, and a similar heat exchanger 845 may be used to remove residual water vapor in the gas leaving the water-hydrogen phase separator 809.

The oxygen generated by the URFC stack 901 may be vented to the atmosphere through a leak valve 817 located in line 841, or accumulated in a storage system (not shown) that may include a compressor that receives the oxygen from the URFC stack 901 and transfers the compressed oxygen to a plurality of storage vessels. The apparatus 110 may further transfer the hydrogen fuel generated in the URFC stack 901 to a fuel storage system 706 through a fuel storage line 840. Once the fuel generation is completed, the URFC stack 901 may be depressurized by closing a valve 820 on the hydrogen supply line 840, and venting a small amount of hydrogen fuel though a regulated leak valve 821 connected to a hydrogen vent line 822.

Turning now to the power generation mode, a recirculating water loop 853 extends from the reservoir 815 through a pump 812 and into the integrated CDI assembly 1200 to provide deionized water to the assembly 1200 for humidification of the reactants. Excess water leaving the assembly 1200 may be routed through a heat exchanger 850 before being returned to the reservoir 815. Hydrogen from the fuel storage system 706 is delivered to the assembly 1200 by a fuel delivery line 842 that is connected to the system 706. The line 842 further includes a pressure regulator 854 to permit delivery of the fuel to the URFC stack 901 at the proper pressure.

Excess hydrogen may be removed from the assembly 1200 through a hydrogen return line 843, and returned to the fuel storage system 706. An oxygen-containing oxidizer stream is delivered to the assembly 1200 through an oxidizer inlet line 851, with excess oxidizer being removed from the assembly 1200 through an oxidizer outlet line 852. Electrodes 911 and 912 permit electrical current produced by the URFC stack 901 to be transferred to the electrical converter 910 to convert the DC output of the stack 901 to other voltages and modes as required by an electrical load 855.

The combination of a URFC stack with the integrated water deionizer and reactant humidification module additionally allows an integrated power generation apparatus to be formed that has still fewer discrete components, since the functionality of the conditioning module has been combined in the CDI stack. Accordingly, the present embodiment may have inherently less weight and provide enhanced cooling to the URFC stack.

Figure 12:
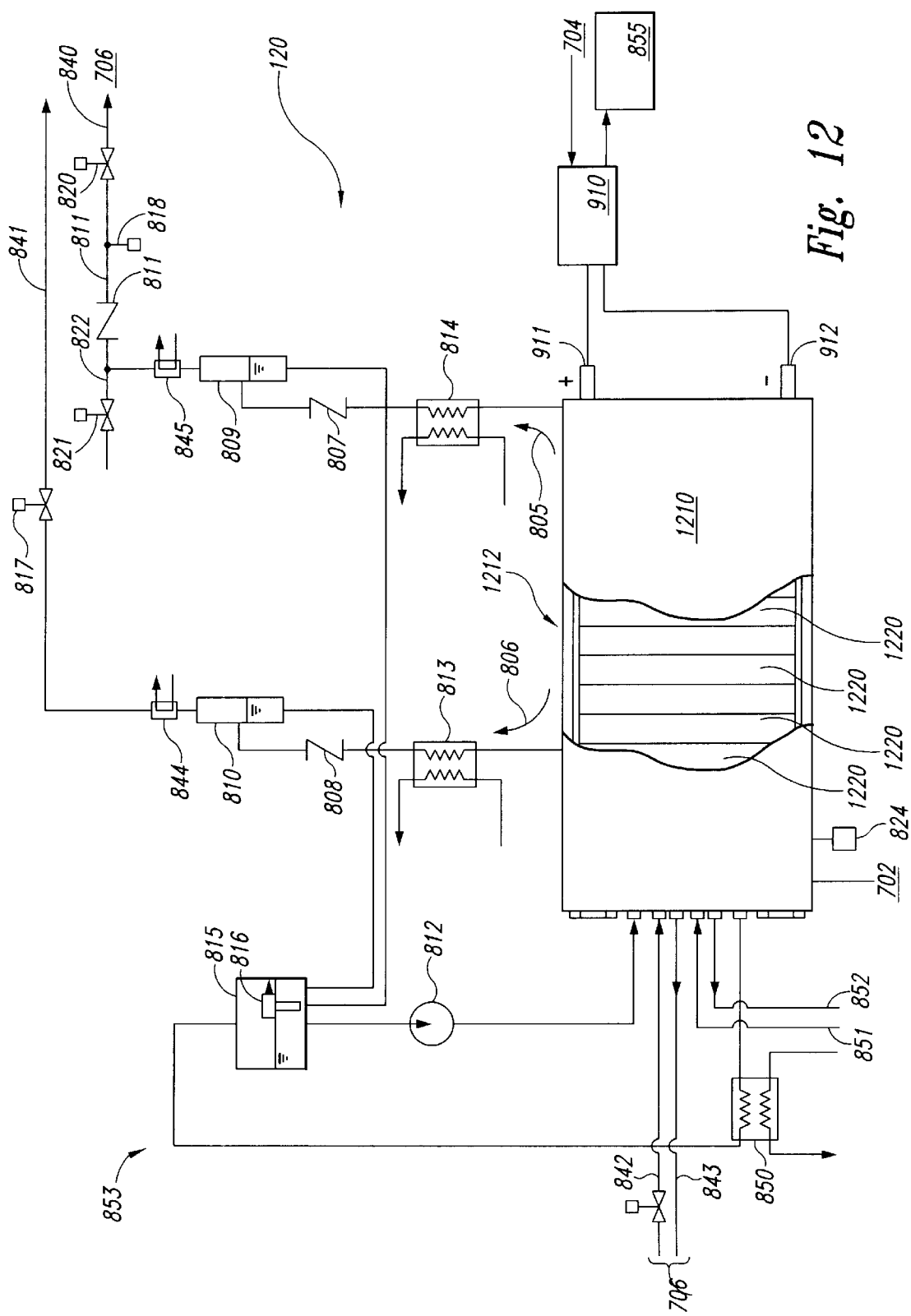
FIG. 12 is a partial cutaway, schematic diagram of an integrated power generation apparatus according to still another embodiment of the invention.

FIG. 12 is a partial cutaway, schematic diagram of an integrated power generation apparatus 120 according to still another embodiment of the invention. A URFC stack 1210 is comprised of a plurality of electrically and fluidly interconnected modules 1220 that are positioned within an interior portion of the URFC stack 1210. The modules 1220 are structured to combine the functionality of a URFC stack with an integrated CDI module, as previously described in connection with FIGS. 9 and 10. Accordingly, each module 1220 may produce deionized water, condition the reactants within the stack and produce fuel by electrolysis in a fuel generation mode, and produce electricity in a power generation mode.

With the apparatus 120 operating in the fuel generation mode, water is delivered to the URFC stack 1210 from an input source 702, and is progressively deionized as it passes through the stack 1210. Electrical current is applied to the URFC stack 1210 from an external source 704. Since the electrical current received from the external source 704 may not be compatible with the electrical requirements of the URFC stack 1210, a power converter 910 is interposed between the source 704 and the apparatus 120 to ensure electrical compatibility.

With the apparatus 120 still operating in the fuel generation mode, two-phase mixtures of hydrogen and water 805, and oxygen and water 806 are generated by electrolysis in the stack 901, which are collected and flow out of the URFC stack 1210 through heat exchangers 813 and 814. Check valves 807 and 808 receive the mixtures 805 and 806 from the heat exchangers 813 and 814 to prevent the two-phase mixtures 805 and 806 from returning to the URFC stack 1210. A water-hydrogen phase separator 809, and a water-oxygen phase separator 810 separate the liquid and gaseous components in the two-phase mixtures 805 and 806. The deionized water collected at the water-oxygen phase separator 810 and the water-hydrogen phase separator 809 may be deposited in a water level controller reservoir 815 and stored. A floating level sensor 816 may monitor the water level in the reservoir 815. Additionally, a heat exchanger 844 may be used to remove residual water vapor in the gas leaving the water-oxygen phase separator 810, and a similar heat exchanger 845 may be used to remove residual water vapor in the gas leaving the water-hydrogen phase separator 809.

The oxygen generated by the URFC stack 1210 may be vented to the atmosphere through a leak valve 817 located in line 841, or accumulated in a storage system (not shown) that may include a compressor that receives the oxygen from the URFC stack 1210 and transfers the compressed oxygen to a plurality of storage vessels. The apparatus 120 may further transfer the hydrogen fuel generated in the URFC stack 1210 to a fuel storage system 706 through a fuel storage line 840. Once the fuel generation is completed, the URFC stack 1210 may be depressurized by closing a valve 820 on the hydrogen supply line 840, and venting a small amount of hydrogen fuel though a regulated leak valve 821 connected to a hydrogen vent line 822.

Turning now to the power generation mode, a recirculating water loop 853 extends from the reservoir 815 through a pump 812 and into the stack 1210 to provide deionized water to the stack 1210 for humidification of the reactants. Excess water leaving the stack 1210 may be routed through a heat exchanger 850 before being returned to the reservoir 815. Hydrogen from the fuel storage system 706 is delivered to the stack 1210 by a fuel delivery line 842 that is connected to the system 706. The line 842 further includes a pressure regulator 854 to permit delivery of the fuel to the URFC stack 1210 at the proper pressure.

Excess hydrogen may be removed from the assembly 1200 through a hydrogen return line 843, and returned to the fuel storage system 706. An oxygen-containing oxidizer stream is delivered to the URFC stack 1210 through an oxidizer inlet line 851, with excess oxidizer being removed from the stack 1210 through an oxidizer outlet line 852. Electrodes 911 and 912 permit electrical current to be transferred to a converter 910 so that electrical current produced by the stack 1210 may be transferred to a load 855. The electrodes 911 and 912 also receive electrical current from a source 704 through the converter 910 for the production of fuel by electrolysis.

Figure 13:
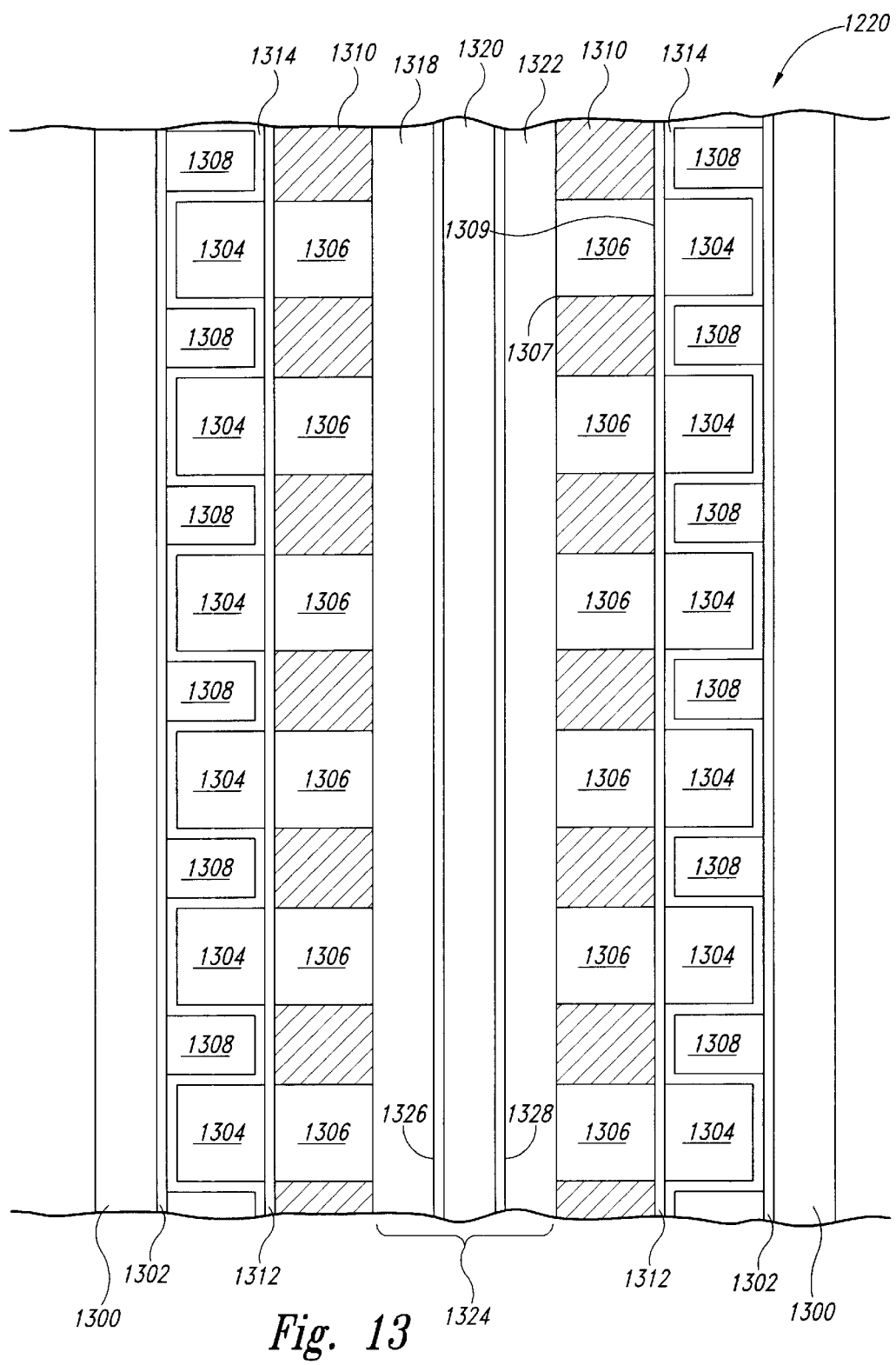
FIG. 13 a cross sectional, schematic view of the module shown in FIG. 12.

Turning to FIG. 13, a cross sectional, schematic view of the module 1220 is shown to describe the structural details of the module 1220 in greater detail. A polymer membrane electrode 1320 in interposed between electrode layers 1318 and 1322. Electrocatalyst layers 1326 and 1328 are disposed on the electrode layers 1318 and 1322, and are substantially in facial contact with the polymer membrane electrode 1320. The membrane electrode 1320, the electrode layers 1318, and the electrocatalyst layers 1326 and 1328 thus form a membrane electrode assembly (MEA) 1324 of a URFC cell. Flow field plates 1308 comprised of a fluid impermeable material are positioned on either side of the MEA 1324 and have a plurality of fluid channels 1306 disposed therein. The channels 1306 project through the flow field plates 1308 to define fluid surfaces 1307 and 1309 through which fluids may migrate. Water permeable membranes 1312 are positioned on the flow field plates 1308, with the membranes 1312 substantially overlapping the fluid surfaces 1309. A flow channel plate 1314 that is comprised of a water impermeable material substantially abuts the membranes 1312. The plates 1314 include a plurality of undulating corrugations that are spaced apart so that when the plates 1314 is positioned on the membranes 1312, the channels 1304 are defined, which will be in substantial alignment with the channels 1306 of the flow field plates 1308. An outer layer 1302 comprised of an electrosorptive material, such as a carbon aerogel composite abuts the flow channel plates 1314 and further defines flow channels 1308. Planar electrodes 1300 substantially abut both outer layers.

Referring now to FIGS. 12 and 13, the operation of the module 1220 will now be described. Water is received by the module 1220 from a water source 702. The water is routed through each of the channels 1308, and is exposed to the outer layer 1302 that is comprised of the electrosorptive material. When the plate electrodes 1300 are electrically coupled to the power supply 910, ions present in the water that is routed through the channels 1308 is progressively deionized. A suitable flow manifold (not shown) routes water through the channels 1308, and also routes the deionized water produced in the channels 1308 to the channels 1304 formed in the channel plates 1314. The deionized water in channels 1304 migrates across the membrane 1312 to humidify and further condition the reactant gases that are routed through the channels 1306. The reactants thus conditioned may then migrate through the MEA 1324, as previously described, to produce fuel when the module 1220 is operated in the fuel generation mode, or to produce electricity when the module is operated in the power generation mode.

Although planar electrodes are employed in the present embodiment, other electrode configurations are possible, and within the scope of the invention. For example, a conductive channel plate, as described in connection with the embodiment disclosed in FIG. 9 may also be used.

The apparatus 120 including the module 1220 allows the previously described integrated CDI apparatus to be integrated into a URFC device, thus allowing still further weight reductions. Further, the combination of the integrated CDI with the URFC stack provides for better thermal management of the stack since the untreated and deionized water streams are available to transport heat away from the interior portions of the stack.

The above description of illustrated embodiments of the invention is not intended to be exhaustive or to limit the invention to the precise form disclosed. While specific embodiments of, and examples of, the invention are described in the foregoing for illustrative purposes, various equivalent modifications are possible within the scope of the invention, as those skilled in the relevant art will recognize. For example, the disclosed embodiments, or modifications thereof, may be used in mobile applications, such as in a fuel cell powered vehicle, or in stationary applications, such as a stationary power plant. Additionally, the disclosed embodiments, or modifications thereof, may be used in mobile applications where an individual person must carry the embodiment. Moreover, the various embodiments described above can be combined to provide further embodiments. Accordingly, the invention is to be determined entirely by the following claims.

What is claimed is:

1. An apparatus for the generation of electrical energy and the production of hydrogen, comprising:
    a first system fluidly coupled to a water source and electrically coupled to an electrical energy source that receives water and electrical energy to produce deionized water; and
    a second system operable in either a fuel generation mode or a power generation mode, the second system being fluidly coupled to the first system to receive deionized water and being electrically coupled to the electrical energy source to receive electrical energy to generate hydrogen and oxygen when the system is operating in the fuel generation mode, the hydrogen being received by a fluidly coupled hydrogen storage system, and the second system receiving hydrogen from the hydrogen storage system and an oxidizer from an oxidizer source that is fluidly coupled to the second system and combining the hydrogen and the oxidizer to generate electrical energy when the system is operating in the power generation mode, the first system substantially abutting the second system to form a single unitary assembly.

2. The apparatus according to claim 1 wherein the hydrogen storage system is further comprised of a compressor that is fluidly coupled to a plurality of storage vessels structured to contain hydrogen, the compressor fluidly receiving the hydrogen generated during the fuel generation mode and fluidly delivering the compressed hydrogen to the storage vessels.

3. The apparatus according to claim 1 wherein the hydrogen storage system is further comprised of a storage vessel containing a metal hydride that is fluidly coupled to the second system.

4. The apparatus according to claim 1 wherein the second system is further comprised of a humidification module that receives hydrogen from the hydrogen storage system and oxidizer from the oxidizer source to humidify the hydrogen and oxidizer prior to combination in the second system.

5. The apparatus according to claim 1 further comprising a water storage system fluidly coupled to the first system and the second system, the water storage system further including a water storage vessel to sealably contain deionized water.

6. The apparatus according to claim 1 wherein the electrical energy source is further comprised of an electrical converter that is electrically coupled to a utility grid and to the first system and or the second system that receives alternating current from the utility grid, and delivers direct current to the first and/or second system.

7. The apparatus according to claim 1 wherein the second system is further comprised of an electrical converter that is electrically coupled to an electrical load that receives the electrical energy generated by the second system and transfers the electrical energy to the load when the second system is operating in the power generation mode.

8. The apparatus according to claim 7 wherein the electrical load is further comprised of a utility grid.

9. The apparatus according to claim 7 wherein the electrical load is further comprised of a plurality of electric storage devices.

10. The apparatus according to claim 7 wherein the electrical load is further comprised of a prime mover in an electrically powered vehicle.

11. The apparatus according to claim 1 wherein the first system is further comprised of a capacitive deionization (CDI) device.

12. The apparatus according to claim 1 wherein the second system is further comprised of a unitized regenerative fuel cell (URFC) device.

13. The apparatus according to claim 1 wherein the second system is further comprised of a proton exchange membrane fuel cell (PEMFC) device that is fluidly coupled to a proton exchange membrane electrolysis (PEME) device.

14. The apparatus according to claim 5 wherein the water storage system is further comprised of a recirculation loop that is fluidly coupled to the vessel and the second system that fluidly delivers deionized water from the storage vessel to the second system and fluidly returns at least a portion of the deionized water delivered to the second system when the second system is operating in the power generation mode.

15. The apparatus according to claim 14 wherein the recirculation loop is further comprised of a pump fluidly coupled to the loop to fluidly deliver the deionized water to the second system, and to fluidly return to the storage vessel the at least a portion of the water fluidly delivered to the second system.

16. The apparatus according to claim 15 wherein the recirculation loop is further comprised of a heat exchanger.

17. The apparatus according to claim 1 further comprising an oxygen storage system that is fluidly coupled to the second system that fluidly receives the oxygen generated when the second system is operating in the fuel generation mode, and fluidly delivers oxygen to the second system when the system is operating in the power generation mode.

18. The apparatus according to claim 17 wherein the oxygen storage system is further comprised of a compressor that is fluidly coupled to a plurality of storage vessels structured to contain oxygen, the compressor fluidly receiving the oxygen generated during the fuel generation mode and fluidly delivering the compressed oxygen to the storage vessels.

19. The apparatus according to claim 1 wherein the oxidizer source is further comprised of atmospheric air.

20. A power generation apparatus having a fuel generation mode for generating hydrogen fuel, and a power generation mode for generating electrical energy, comprising:
    a water deionizer that receives electrical current from an electrical energy source and water from a water source to produce deionized water;
    an electrolyzer in fluid communication with the water deionizer that receives the deionized water from the deionizer and electrical current from the electrical energy source to decompose the deionized water into hydrogen and oxygen while operating in the fuel generation mode, the deionizer substantially abutting the electrolyzer to form a single unitary assembly;
    a hydrogen storage system in fluid communication with the electrolyzer that fluidly receives the hydrogen produced by the electrolyzer while operating in the fuel generation mode; and
    a fuel cell assembly that is in fluid communication with a source of an oxidizer and in fluid communication with the storage system that fluidly receives the hydrogen from the storage system and fluidly receives the oxidizer from the oxidizer source and combines the hydrogen and the oxidizer to produce electrical energy while operating in the power generation mode.

21. The apparatus according to claim 20 wherein the water deionizer is further comprised of a capacitive deionization (CDI) device.

22. The apparatus according to claim 20 wherein the electrolyzer is further comprised of a proton exchange membrane electrolysis (PEME) device.

23. The apparatus according to claim 20 wherein the fuel cell assembly is further comprised of a proton exchange membrane fuel cell (PEMFC) device.

24. The apparatus according to claim 20 wherein the electrolyzer is further comprised of a unitized regenerative fuel cell (URFC) device.

25. The apparatus according to claim 20 wherein the fuel cell assembly is further comprised of a unitized regenerative fuel cell (URFC) device.

26. The apparatus according to claim 20 wherein the hydrogen storage system is further comprised of a compressor that is in fluid communication with a plurality of storage vessels, the compressor fluidly receiving the hydrogen generated by the electrolyzer and fluidly delivering the compressed hydrogen to the storage vessels.

27. The apparatus according to claim 20 wherein the hydrogen storage system is further comprised of a metal hydride storage medium.

28. The apparatus according to claim 20 wherein the fuel cell assembly is further comprised of a humidification module that is in fluid communication with each of the deionizer, the storage system and the oxidizer source to fluidly receive deionized water from the deionizer to humidify the hydrogen fluidly received from the storage system and the oxidizer fluidly received from the oxidizer source.

29. The apparatus according to claim 20 further comprising a water storage system in fluid communication with the deionizer and the electrolyzer, the storage system including a water storage vessel to sealably contain deionized water.

30. The apparatus according to claim 20 wherein the electrical energy source is further comprised of an electrical converter in electrical communication with a utility grid and in communication with the deionizer and/or the electrolyzer that delivers direct current to the deionizer and/or the electrolyzer.

31. The apparatus according to claim 20 wherein the fuel cell assembly is further comprised of an electrical converter that is in electrical communication with an electrical load that receives the electrical energy generated by the fuel cell and transfers the electrical energy to the load.

32. The apparatus according to claim 31 wherein the electrical load is further comprised of a utility grid.

33. The apparatus according to claim 31 wherein the electrical load is further comprised of a plurality of electrical storage devices.

34. The apparatus according to claim 31 wherein the electrical load is further comprised of a prime mover in an electrically powered vehicle.

35. The apparatus according to claim 29 wherein the water storage system is further comprised of a recirculation loop that is in fluid communication with the vessel and the fuel cell assembly that fluidly delivers deionized water from the storage vessel to the fuel cell assembly and fluidly returns at least a portion of the deionized water delivered to the fuel cell assembly.

36. The apparatus according to claim 35 wherein the recirculation loop is further comprised of a pump fluidly coupled to the loop to fluidly deliver the deionized water to the fuel cell assembly, and to fluidly return to the storage vessel the at least a portion of the water fluidly delivered to the fuel cell assembly.

37. The apparatus according to claim 36 wherein the recirculation loop is further comprised of a heat exchanger.

38. The apparatus according to claim 20 further comprising an oxygen storage system that is in fluid communication with the electrolyzer and the fuel cell assembly that fluidly receives oxygen from the electrolyzer and fluidly delivers oxygen to the fuel cell assembly.

39. The apparatus according to claim 38 wherein the oxygen storage system is further comprised of a compressor that is in fluid communication with a plurality of storage vessels, the compressor fluidly receiving the oxygen generated by the electrolyzer and fluidly delivering the compressed oxygen to the storage vessels.

40. An integrated fuel and power generation apparatus, comprising:

a plurality of substantially abutting and interconnected modules, each module coupled to an electrical energy source and operable to deionize water received from a water source to produce hydrogen when the modules are operated in a fuel generation mode, the modules being further coupled to an electrical load and operable to humidify hydrogen and an oxidizer and to combine the hydrogen and the oxidizer to generate electrical energy when operated in a power generation mode.

41. The apparatus according to claim 40, further comprising a hydrogen storage system fluidly coupled to the plurality of modules.

42. The apparatus according to claim 41, wherein the hydrogen storage system is further comprised of a compressor that is fluidly coupled to a plurality of storage vessels structured to contain hydrogen, the compressor fluidly receiving the hydrogen generated during the fuel generation mode and fluidly delivering the compressed hydrogen to the storage vessels.

43. The apparatus according to claim 41 wherein the hydrogen storage system is further comprised of a storage vessel containing a metal hydride that is fluidly coupled to the plurality of modules.

44. The apparatus according to claim 40 further comprising a water storage system fluidly coupled to the modules, the water storage system further including a water storage vessel to sealably contain deionized water.

45. The apparatus according to claim 40, wherein the modules are coupled to a utility grid when operated in the fuel generation mode.

46. The apparatus according to claim 45, wherein the modules are coupled to the utility grid through an electrical converter that receives alternating current from the utility grid, and delivers direct current to the modules.

47. The apparatus according to claim 40, wherein the electrical load is further comprised of a utility grid coupled to the modules by an electrical converter.

48. The apparatus according to claim 40, wherein the electrical load is further comprised of a plurality of electric storage devices.

49. The apparatus according to claim 40, wherein the electrical load is further comprised of a prime mover in an electrically powered vehicle.

50. The apparatus according to claim 44 wherein the water storage system is further comprised of a recirculation loop that is fluidly coupled to the vessel and the modules that fluidly delivers deionized water from the storage vessel to the modules and fluidly returns at least a portion of the deionized water delivered to the modules when the modules are operating in the power generation mode.

51. The apparatus according to claim 50 wherein the recirculation loop is further comprised of a pump fluidly coupled to the loop to fluidly deliver the deionized water to the modules, and to fluidly return to the storage vessel the at least a portion of the water fluidly delivered to the modules.

52. The apparatus according to claim 50 wherein the recirculation loop is further comprised of a heat exchanger.

53. The apparatus according to claim 40, further comprising an oxygen storage system that is fluidly coupled to the modules that fluidly receives the oxygen generated when the modules are operating in the fuel generation mode, and fluidly delivers oxygen to the modules when the system is operating in the power generation mode.

54. The apparatus according to claim 53 wherein the oxygen storage system is further comprised of a compressor that is fluidly coupled to a plurality of storage vessels structured to contain oxygen, the compressor fluidly receiving the oxygen generated during the fuel generation mode and fluidly delivering the compressed oxygen to the storage vessels.

55. The apparatus according to claim 40 wherein the oxidizer is further comprised of atmospheric air.

* * * * *